US011954532B2

(12) United States Patent
Daniels

(10) Patent No.: US 11,954,532 B2
(45) Date of Patent: Apr. 9, 2024

(54) RECONCILING RESOURCE MANAGEMENT PLATFORMS

(71) Applicant: Pollen, Inc., Leawood, KS (US)

(72) Inventor: Kevin Daniels, Leawood, KS (US)

(73) Assignee: POLLEN, INC., San Francisco, CA (US)

( * ) Notice: Subject to any disclaimer, the term of this patent is extended or adjusted under 35 U.S.C. 154(b) by 263 days.

(21) Appl. No.: 17/334,124

(22) Filed: May 28, 2021

(65) Prior Publication Data

US 2021/0373960 A1 Dec. 2, 2021

Related U.S. Application Data

(60) Provisional application No. 62/704,819, filed on May 29, 2020, provisional application No. 63/032,086, filed on May 29, 2020.

(51) Int. Cl.
*G06F 9/44* (2018.01)
*G06F 9/48* (2006.01)
(Continued)

(52) U.S. Cl.
CPC ............ *G06F 9/5038* (2013.01); *G06F 9/485* (2013.01); *G06F 9/5088* (2013.01); *G06F 9/542* (2013.01)

(58) Field of Classification Search
CPC ...... G06F 9/5038; G06F 9/485; G06F 9/5088; G06F 9/542
See application file for complete search history.

(56) References Cited

U.S. PATENT DOCUMENTS 7,039,669 B1 5/2006 Wong et al.
9,881,014 B1 1/2018 Bono et al.
(Continued)

FOREIGN PATENT DOCUMENTS

CN 110505239 A 11/2019
JP 02-037430 A 2/1990
WO WO2016115885 A * 7/2016 ............. H04L 65/40

OTHER PUBLICATIONS

International Search Report and Written Opinion received for PCT Patent Application No. PCT/US2021/035288, dated Oct. 7, 2021, 8 pages.

(Continued)

*Primary Examiner* — Diem K Cao
(74) *Attorney, Agent, or Firm* — Shook, Hardy & Bacon L.L.P.

(57) ABSTRACT

Systems, methods and computer-readable media are provided for receiving an indication to suspend a first event associated with a first resource indicator that is stored in a first data file associated with a first resource management software utilized by a first entity. A second indication to suspend the first event is determined to be provided by a second entity utilizing a second resource management software, the second indication to suspend the first event indicating a modification to both the first data file associated with a first resource management software and a second data file associated with the second resource management software. The first data file is reconciled by instructing the first resource management software to modify the first resource indicator in the first data file so as to correspond to a modification to a second resource indicator associated with the second data file.

20 Claims, 6 Drawing Sheets

(51) Int. Cl.
*G06F 9/50* (2006.01)
*G06F 9/54* (2006.01)

(56) References Cited

U.S. PATENT DOCUMENTS

| | | |
|---|---|---|
| 2002/0038313 A1 | 3/2002 | Klein et al. |
| 2009/0138890 A1 | 5/2009 | Blake et al. |
| 2019/0034422 A1 | 1/2019 | Chen |
| 2019/0288850 A1 | 9/2019 | Beecham et al. |
| 2020/0052884 A1 | 2/2020 | Tong et al. |

OTHER PUBLICATIONS

International Preliminary Report on Patentability received for PCT Patent Application No. PCT/US2021/035288 dated Dec. 8, 2022, 7 pages.

Supplementary European search report dated Dec. 15, 2023 for EP Application No. 21814596, 9 page(s).

* cited by examiner

RECONCILING RESOURCE MANAGEMENT PLATFORMS

CROSS-REFERENCE TO RELATED APPLICATIONS

This application claims the benefit of U.S. Provisional Application No. 63/032,086, filed May 29, 2020 and titled "Reconciling Resource Management Platforms," and U.S. Provisional Application No. 62/704,819, filed May 29, 2020 and titled "Rerouting Resources for Management Platforms." The entire contents of each of the foregoing applications are incorporated by reference herein.

BACKGROUND

Resource management systems are capable of maintaining data for many different types of transactions. Data related to transactions may be stored across multiple records or accounts on multiple electronic resource management systems. For example, suppose transaction event data indicates that a first entity will transfer resources to a second entity. Data related to this transaction event may be stored in a first record of an electronic resource management system. Data related to the transaction may also be stored in another record of a second electronic resource management system. Technical problems exist as electronic resource management systems are typically not integrated (e.g., based on unique application layers or distinct software platforms that are offered by different vendors). Additionally, technical problem exist in identifying when an event should be suspended, for example, due to the technical challenges of identifying which events are eligible for suspension across disparate platforms and how long to delay resource transfer so as to satisfy user and/or network constraints. As such, conventional electronic resource management systems are unable to confirm the suspension of an event or reconcile modifications to event data maintained by these disparate electronic resource management systems.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

At a high level, aspects described herein relate to improvements to computer-performed resource management technologies. In particular, embodiments of these technologies can detect whether an event associated with a resource transfer qualifies for suspension, determine information regarding how to suspend the event, and reconcile event data across disparate electronic resource management systems to reflect changes incurred (e.g., based on suspending the event). For example, the technology described herein can determine whether an event can be suspended and, if so, which events will be suspended based on user and/or network constraints. If an event is suspended, the instant technology can reconcile corresponding event data stored across disparate software platforms.

Embodiments of the technologies described in this disclosure may monitor user activity to detect an indication that an event qualifies for suspension. The event may qualify for suspension based on determining that one or more entities associated with the event indicate that the event is eligible for suspension and/or whether one or more parameters for modifying the event have been provided. In some embodiments, the one or more parameters for suspending the event may include thresholds or ranges for increasing (or decreasing) the amount of resources (or an indication of resources) to be transferred. The one or more parameters for suspending the event may also include thresholds or ranges for delaying a time for transferring the resources. Based on an entity having provided an indication that an event may be suspended and/or the presence of one or more parameters for suspending the event, the event may be eligible for suspension.

If one or more events are eligible for suspension, information about suspending the event can be evaluated to determine which events (if any) will be suspended. New event data associated with suspending the event may be generated. When embodiments determine to suspend an event, new event data including an increase (or decrease) of resources transferred and a newly scheduled time for transferring resource is generated (e.g., based on the one or more parameters). Instructions may also be generated and communicated to an electronic resource management system to modify a resource indicator to represent the new amount of resources that will be allocated or transferred and the newly scheduled time for the transfer. In this way, an event can be suspended and event data stored across disparate software platforms may be reconciled.

BRIEF DESCRIPTION OF THE DRAWINGS

The present technology is described in detail below with reference to the attached figures, wherein.

DETAILED DESCRIPTION

Figure 1:
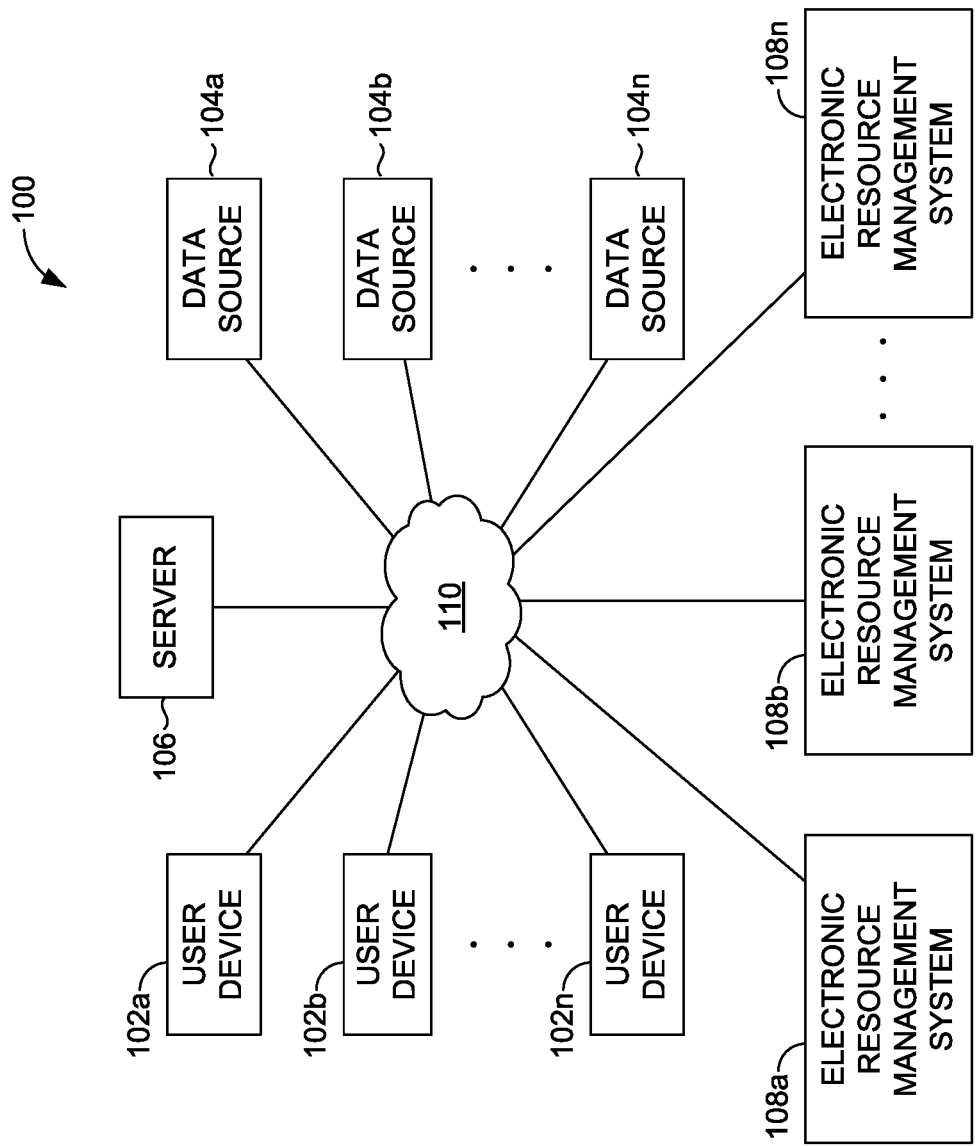
FIG. 1 is a block diagram of an example operating environment suitable for implementing aspects of the disclosure.

The subject matter of aspects of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein provide systems, methods, and computer storage media for, among other things, improving resource management technology. Technologies described herein can determine whether to suspend an event and, if so, reconcile event data across multiple electronic resource management systems. For example and as further described herein, a first and second electronic resource management system may store data about an event. The event may be a future transfer of resources between one or more users and/or one or more user devices (both of which may be referred to as an entity). Event data for the event may include data for the amount of resources (or indication of resources) that will be transferred, a scheduled time for transferring the resources, the entities involved in the resource transfer, or other information about event. More particularly, the first electronic resource management system may store data about inbound resources to be received and the second electronic resource management system may store data about outbound resources to be transferred. Aspects of the instant technology can determine which events should be suspended and then reconcile event data across the first and second electronic resource management system, thereby improving how a computer manages the transfer of resources and maximizes the availability of resources at any given time.

Technical problems exist with conventional technology to determine whether an event associated with a particular resource transfer should be suspended or cause data representing the transfer to be modified across electronic resource management systems when the transfer is suspended. For example, electronic resource management systems are complex software applications that have unique application layers, making them difficult to integrate. In some instances, synchronizing electronic resource managements systems so as to suspend an event would require software technicians to alter and/or adapt the application layer (or other software layers) of these electronic resource management systems, which is time consuming and costly. Additionally, if the electronic resource management system is purchased from (or is operated by) a third-party, the third-party might restrict altering or adapting any aspect of the electronic resource management system, thereby preventing the synchronization of electronic resource management systems. Further complicating matters, entities involved in suspending an event might employ disparate resource management systems that require specific commands to access and/or modify event data in their respective data repositories.

Accordingly, at a high level, embodiments disclosed herein comprise technologies that facilitate resource transfers by determining which events should be suspended and reconciling event data accordingly. This can provide flexibility in how much and/or when resources are transferred so as to meet demands of particular system or entity. In particular, some embodiments comprise an event suspension service for computer applications that detects whether an event should be suspended, determines how to suspend the event, and facilitates an appropriate action to reconcile event data maintained by electronic resource management systems. It should be appreciated that "suspending" the event may include delaying (e.g., postponing or rescheduling) the event. Accordingly, at a high level, embodiments disclosed herein comprise technologies that facilitate resource transfers by determining which events should be suspended and reconciling event data accordingly. This can provide flexibility in how much and/or when resources are transferred so as to meet demands of particular system or entity. In particular, some embodiments comprise an event suspension service for computer applications that detects whether an event should be suspended, determines how to suspend the event, and facilitates an appropriate action to reconcile event data maintained by electronic resource management systems. It should be appreciated that "suspending" the event may include delaying (e.g., postponing or rescheduling) the event. In particular and in some aspects, a suspended event may occur at a time later than when the event was originally scheduled or expected to transpire, or later than what is customary or default. Thus it is not required that a suspended event was initially scheduled before being suspended. It is contemplated that in some embodiments, the initial scheduling of the event may be at a time delayed from when it would be customary or expected for the event to transpire.

For the sake of clarity and consistency, many of the examples describe the instant technology within the context of financial transactions, which often have imposed technical constraints related to timing and validation, as well as time-dependent variables. However, the underlying improvements to technologies or the computer are not limited to the financial industry. One skilled in the art would recognize that the improvement of suspending an event and reconciling event data can be utilized in many different industries and/or technology areas that manage the transfer of resources. For example, the improvement of suspending an event and reconciling event data can be used in a telecommunications network to reduce peak network traffic by suspending a resource transfer (e.g., data packet transfer) until a future scheduled time and modifying data maintained by an electronic resource management system (e.g., a packet scheduler) accordingly. It is unrealistic to provide examples with respect to each of these technological fields because, as mentioned, one skilled in the art could employ the improvement to technology to a variety of industries.

In some embodiments, user activity may be monitored to detect an indication to suspend an event. User activity may generally include any communication or data received from an entity. The user activity may comprise, for example and without limitation, electronic communications (e.g., an email confirmation), voice mail, or other communications received by the user; app activity on a user's computing device (e.g., user's selection of an event to be suspended); user-provided electronic documents or files (e.g., Comma-Separated Values file or Extensible Markup Language file); user communications received via a website or web-based interface (e.g., files uploaded by the user through a website); or other communications from the user. In some embodiments, a user may specify which types of event data, applications, or event information sources, are monitored, and consent may be obtained from the user before monitoring those sources.

The indication may include one or more entities approval of the suspension of the event. As further described herein, embodiments may monitor user activity information to determine whether an entity approved the suspension of one or more events. For example, if the event is associated with a financial resource transferred from a first entity to a second entity (e.g., which may be in exchange for receiving goods or services from the second entity), user activity may be monitored to determine whether the first entity and/or the second entity have approved suspending the transfer of financial resources.

Because the event is associated with the transfer of resources, an entity associated with the resource transfer may approve the suspension of the event in order to delay the transfer of the resource. Additionally, the entity transferring the resource may determine to increase (or decrease) the amount of resources to be transferred in exchange for delaying the resource transfer. As for the entity receiving the resource, it may approve the suspension of the event in order to receive an increased (or decreased) amount of resources. This can provide flexibility as the suspension service can suspend the transfer of resources based on network conditions, computing resources, resource availability, and/or entity preferences.

In some aspects, an entity may approve the suspension of the event by identifying the event or providing information about the event to the suspension service. By way of example, one or more entities may provide event data (e.g., via user activity and/or a user profile) having information about the event (e.g., entities associated with the event, an amount of resources to be transferred, a scheduled date for transferring the resources, or other event data). Based on identifying the event within the event data, embodiments may determine that the event is approved for suspension. Continuing with the example above, where the event is associated with the transfer of financial resources from the first entity to the second entity, the event may be approved for suspension if information about the transfer of financial resources is provided by the first and/or second entity.

An indication to suspend an event if it is determined that one or more entities have provided one or more event suspension parameters for suspending the event. The one or more parameters may include parameters associated with an increase (or decrease) in the amount of resources to be transferred and/or parameters for the amount of time to suspend the resource transfer. In some instances, one or more entities associated with the event may provide the one or more event suspension parameters (e.g., via user activity and/or a user profile).

Based on receiving an indication to suspend an event, it may be determined which (if any) of the events should be suspended. A determination to suspend an event may be based on satisfying event suspension parameters provided by entities involved in the resource transfer. For instance, an entity associated with the event may provide a minimum/maximum threshold for increasing (or decreasing) the amount of resources to be transferred and/or a minimum/maximum threshold of time for suspending the time of the resource transfer. Another entity associated with the event may also provide similar thresholds. An event may be suspended based on satisfying one or more of the entities' parameters. Continuing with the example above, the buyer and/or supplier may define a minimum/maximum threshold for an amount of increasing (or decreasing) the financial resource and/or a minimum/maximum amount of time for suspending the transfer of the financial resource. It may be determined to suspend the financial resource may be made so long as the suspension of satisfies the thresholds provided by the first and/or second entity.

In some instances, the determination to suspend the event may be based on aggregating a set of events. One or more entities may provide a set of events. Embodiments may determine a particular combination of events (if not all of the events) to suspend among the set of event. Specifically, a particular combination of events may be suspended if the combination satisfies an aggregated suspension parameter. It should be appreciated, as described in greater detail below, that the aggregation of the events may allow an individual event to be suspended even if that particular event would have failed to individually satisfy a particular event suspension parameter.

In some instances, the determination to suspend the event may be based on rerouting a resource transfer associated with an event. A rerouting entity may provide an indication that it will participate in the suspension of one or more events. For example, a first entity and a second entity may indicate that the event may be suspended. The event may include transferring a resource from the first entity to the second entity. The first entity and/or second entity may indicate that a rerouting entity may participate in the rerouting of the event. The even may be suspended based on rerouting the resources from the first entity to the routing entity, and from the routing entity to the second entity. The rerouting of the resources may occur at different scheduled times. As such, the rerouting entity may "bridge" the gap between the first entity and a second entity.

Some embodiments may facilitate modifying event data in one or more electronic resource management systems by instructing an electronic resource management system to modify previously stored data about the event. For instance, embodiments may instruct one or more resource management systems to modify a previously stored resource indicator and/or scheduled time for the resource transfer to reflect newly generated suspended event data. Continuing with the example above, based on determining that the financial resource being transferred from the first entity to the second entity is suspended, embodiments may instruct an electronic resource management system associated with the first entity and/or the electronic resource management system associated with the second entity to modify information about the financial resource transfer so as to capture a new amount of financial resource and/or a new time for transferring the financial resource.

As mentioned, one skilled in the art would recognize that the improvement of suspending an event and reconciling event data can be utilized in many different industries and/or technology areas that manage the transfer of resources. For instance, in telecommunications, a packet scheduler may have scheduled an event associated with transferring a video from a one user device to another user device. Based on determining to suspend the event, a scheduler may instruct the electronic resource management system on the sending user device and/or the receiving user device to modify event data associated with transferring the video so as to capture a new amount of data that is to be transferred (e.g., based on reducing the quality of the video and/or increase the quality of the video) and/or a newly scheduled time for transferring the video. This provides greater flexibility in managing the transfer of resources.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of computing devices, such as user devices 102a and 102b through 102n; a number of data sources, such as data sources 104a and 104b through 104n; a number of electronic resource management systems, such as electronic resource management systems 108a and 108b through 108n; server 106; and network 110. It should be understood that operating environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, electronic resource management systems, servers, and data sources may be employed within operating environment 100 and within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106, user devices 102a and 102b through 102n, or electronic resource management systems 108a and 108b through 108n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart speaker, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. For instance, in one embodiment, one or more data sources 104a through 104n provide (or make available for accessing) user activity and/or event data to user-data collection component 210 of FIG. 2. In some embodiments, data sources 104a and 104b through 104n include an email account, an inbound resource database, an outbound resource database, event data that has been uploaded (e.g., CSV file), an online portal that provides a user access to the suspension service, computing devices or electronic resource management system that hosts or stores event data, or other data sources. Data sources 104a and 104b through 104n may be discrete from user devices 102a and 102b through 102n, electronic resource management systems 108a and 108b through 108n, and server 106. In one embodiment, one or more of data sources 104a through 104n may be integrated into or associated with one or more of the user device(s) 102a, 102b, or 102n, electronic resource management system 108a, 108b, or 108n, or server 106.

Data sources 104a and 104b through 104n may also include a distributed ledger network. The distributed ledger network may include a plurality of nodes that are each in communication over network 110. Each node of a distributed ledger network may also be a computing device 600 later described in accordance with FIG. 6. In some embodiments, such as in some public Blockchain implementations, each node in the distributed ledger network can operate as a peer to every other node of the distributed ledger network such that no single node is more influential or powerful than any other node. Operations performed by nodes can include, among other things, validating transactions, verifying blocks of transactions, and adding records to an immutable database that is collectively maintained by the nodes. It is contemplated, however, that in some embodiments, a particular subset of the nodes can be specifically designated for performing a subset of or all node operations described herein. In this regard, as opposed to embodiments where each node is a peer with other nodes, some embodiments can employ specially-"designated nodes" (e.g., for private Blockchains or ecosystems where centralization is not a concern) that perform a subset of or all of the described node operations.

In accordance with embodiments described herein, the immutable database collectively maintained by the nodes is referenced herein as a Blockchain. The Blockchain maintained by the distributed ledger network includes a plurality of records that is immutable by virtue of the distributed nature of the distributed ledger network, applied cryptography concepts, and a consensus module that is independently included and operated by any number of nodes. While any node can generate a transaction to be added to the Blockchain, a consensus module may require that the record be added to the Blockchain based on a determination that a consensus (e.g., greater than 50%) of the nodes (or designated nodes) has collectively validated the transaction. In this regard, while each node can independently store a copy of the Blockchain, a record can only be added to the Blockchain when a consensus to add the record has been reached by the nodes (or designated nodes) of the distributed ledger network. The node generating the block must also include, into the block it is generating, a cryptographic hash of the block most-recently added to the Blockchain. Once generated, the node generating the block can send the generated block to the nodes (or designated nodes) to which it is connected.

The nodes (or designated nodes) receiving the generated block can then verify that the block includes one or more valid transactions, includes a hash value of the block most-recently added to the Blockchain, and was generated in accordance with defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network, the generated block including at least the transaction can be verified by another determined consensus of the nodes (or designated nodes). When a determination is made by a consensus of the nodes (or designated nodes) that a block is verified, the newly-verified block is added to the Blockchain immediately subsequent to the previously-added block, the hash of the previously-added block being included in the newly-verified block. As such, each block is cryptographically "chained" to a previous block and a subsequent block. In other words, the cryptographic hashes facilitate maintenance of the order and accuracy of records included in the Blockchain.

In various embodiments, the Blockchain is not necessarily limited to storing records relating to transfers of digital tokens or monetary value. In this regard, a record can include any type of electronic record, including but not limited to one or more transactions, smart contracts, electronic documents, images or other digital media, URIs, alphanumeric text, unique identifiers, I.P. addresses, timestamps, hashes of any of the foregoing, or references to any of the foregoing. Any of the foregoing examples can be viewed as being the subject of a transaction, or can be indirectly associated with a transaction. For instance, ownership of an asset or record of an event stored in a medium other than the Blockchain (e.g., a remote storage device, a cloud server, a database) can be referenced with a unique identifier. If the asset is a digital asset, a URI and/or hash of the digital asset can be the subject of the transaction. If the asset is a tangible asset, a unique identifier associated with the tangible asset can be the subject of the transaction. It is contemplated that any combination or alternative to the foregoing examples remain within the purview of the present disclosure.

In some embodiments, information about an event associated with a resource transfer (e.g., event data) may be stored in a record maintained by one or more nodes of the distributed ledger. Additionally or alternatively, information associated with suspending the event (e.g., one or more event suspension parameters) may be stored in a record maintained by one or more nodes of the distributed ledger. It is contemplated that the components of system 200 may access the distributed ledger to obtain information about an event and/or information associated with suspending an event. It is also contemplated that the components of system 200 may provide information associated with suspending the event (e.g., new event data and/or rerouted event data) to the one or more nodes of the distributed ledger. The one or more nodes may then include information about suspending the event in a newly generated block that is confirmed by other nodes and then added to the distributed ledger, as described herein.

Electronic resource management systems 108a and 108b through 108n may comprise any type of software application platform capable of managing or manipulating an event or data associated with the event. The event may be a future scheduled event that is associated with the transfer of resources. Event data may include, among other things, the amount of resources to be transferred and the scheduled time for the transfer to take place. The electronic resource management system 108n may be capable of maintaining an indication of the amount of resources to be transferred, whether the resource to be transferred are an inbound and/or an outbound resource, a scheduled time for the transfer of resources, entities associated with the event and/or resource transfer, an event identification (event ID), the source of the resource transfer, the destination of the resource transfer, or the like. Each electronic resource management system may access and store event data in one or more databases that may be stored in one or more data sources 104a through 104n.

By way of example, when the instant technology is employed in the financial industry, electronic resource management systems 108a and 108b through 108n are capable of maintaining event data associated with a payment (e.g., due date, payment amount, or entity to which the payment is rendered) similar to enterprise resource planning systems (e.g., as provided by Oracle®, SAP®, or the like) or accounting software (e.g., as provided by QuickBooks®, Quicken®, or the like). The electronic resource management system may thus provide a software application platform for maintaining or manipulating data associated with a general ledger, fixed assets, account payable, account receivable, cash management, financial consolidation, or the like.

In some embodiments, the electronic resource management systems 108a and 108b through 108n maintains event data providing an indication of whether the resource transfer associated with the event is an inbound resource and/or an outbound resource. The inbound resource may be a resource that will be received by a particular user and/or user device at the scheduled time. The outbound resource may be a resource that will be transferred by a particular user and/or user device at a scheduled time.

For example, first electronic resource management system 108a may provide an indication that a resource being transferred at the future scheduled time is an inbound resource, which may be stored in an inbound resource database. Second electronic resource management system 108b may provide an indication that a resource being transferred at the future scheduled time is an outbound resource, which may be stored in an outbound resource database. When the instant technology is employed in the financial industry, the inbound resource database may be an account receivable database and outbound resource database may be similar to an account payable database.

As described in greater detail below, embodiments may determine that an event is suspended and instruct the first electronic resource management system 108a to modify event data in the inbound resource database and instruct the second electronic resource management system 108b to modify corresponding event data in an outbound resource database, thereby reconciling event data for a suspended event across electronic resource management systems 108n. The event data may be described as corresponding event data as a resource transfer may be stored in association with the first electronic resource management system 108a, which provides an indication that the resource is an inbound resource, while the resource transfer is also stored in association with the second electronic resource management system 108b, which provides an indication that the resource is an outbound resource. Although aspects of this disclosure may include descriptions regarding "transferring resources" it is contemplated that in some embodiments, an actual transfer may not occur, but rather an operation updating an indication of resources or resource allocation may be performed. In some instances, for example, it can appear as though a transfer transpired when an indication of resources associated with a first party is decreased, and an indication of resources of a second party is correspondingly increased.

Figure 2:
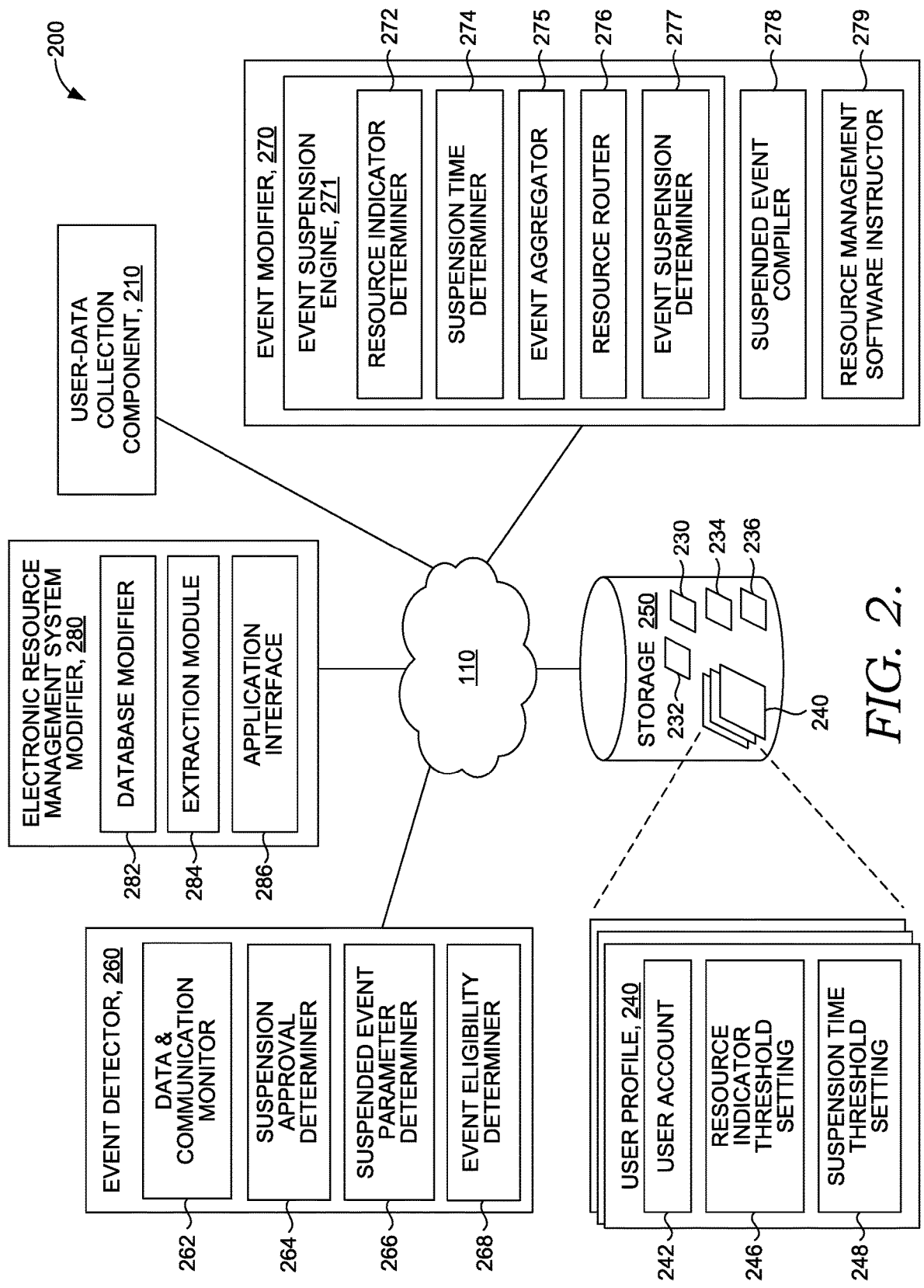
FIG. 2 is a diagram depicting an example computing architecture suitable for implementing aspects of the disclosure.

Operating environment 100 can be utilized to implement one or more of the components of system 200, described in FIG. 2, including components for collecting event data, determining to suspend an event, determining information associated with a suspended event, reconciling information about an event, or other functions carried out by components described herein. For instance, the components of FIG. 2, may operate in whole or in a distributed manner at the server 106, user device(s) 102a-n, electronic resource management system(s) 108a-n, or a combination thereof. Operating environment 100 also can be utilized for implementing aspects of process flows 300, 400, and/or 500 described in FIGS. 3-5, respectively.

Example system 200 includes network 110, which is described in connection to FIG. 1, and which communicatively couples components of system 200 including user-data collection component 210, storage 250, event detector 260, event modifier 270, and electronic resource management system modifier 280. User-data collection component 210, storage 250, event detector 260, event modifier 270, and electronic resource management system modifier 280 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with applications, services, or routines. In particular, such applications, services, or routines may operate on one or more user devices (such as user device 102a), servers (such as server 106), or electronic resource management systems (such as electronic resource management system 108a), or may be distributed across one or more user devices, servers, electronic resource management systems, or be implemented in the cloud. Moreover, in some embodiments, these components of system 200 may be distributed across a network, including one or more servers (such as server 106), client devices (such as user device 102a), electronic resource management systems (such as electronic resource management system 108n), in the cloud, or may reside on a user device such as user device 102a. Further, these components, functions performed by these components, or services carried out by these components may be implemented at appropriate abstraction layer(s) such as the operating system layer, application layer, hardware layer, or other abstraction layer(s) of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments, functionality of these components can be shared or distributed across other components.

Continuing with FIG. 2, user-data collection component 210 is generally responsible for accessing or receiving (and in some cases also identifying) user activity and/or information about an event (e.g., event data) from one or more data sources, such as data sources 104a and 104b through 104n, electronic resource management system, such as electronic resource management system 108a and 108b through 108n, or user devices, such as user device 102a and 102b through 102n. User activity may generally include any communication or data received from a user. The user activity may comprise, for example and without limitation, electronic communications (e.g., an email confirmation), voice mail, or other communications received by the user; app activity on a user's computing device (e.g., user's selection of an event to be suspended); user-provided electronic documents or files (e.g., Comma-Separated Values file or Extensible Markup Language file); user communications received via a website or web-based interface (e.g., files uploaded by the user through a website); or other communications from the user. In some embodiments, a user may specify which types of event data, applications, or event information sources, are monitored, and consent may be obtained from the user before monitoring those sources.

User activity may provide an indication of a user's approval to suspend an event and/or event suspension parameters, such as one or more resource indicator threshold settings, and/or suspension time threshold settings, as described in greater detail below. An event may generally be associated with a resource transfer operation. The resource transfer may be between one or more entities. The resource being transferred may comprise a financial resource (e.g., a payment), a telecommunication or data resource (e.g., a data packet), electronic data to be processed (e.g., raw or unstructured data that is to be processed so as to generate structured data), a physical resource (a physical good or service), a digital resource (e.g., a token), or an indication of these. In some aspects, the event may occur at a particular time or time interval. For example, the event may be associated with a resource transfer that is to occur at scheduled time. When the instant technologies are employed in the financial industry, the event may be associated with a resource transfer that satisfies a financial agreement between one or more entities. For instance, the event may be associated with transferring a financial resource at a future date or historic date.

Event data may be data that provides information about the event. Generally, event data may include information about the amount of resources being transferred, the entities associated with the resource transfer, a time for transferring the resources, and the like. In some aspects, event data may include a resource indicator that represents the amount of resources to be transferred, whether the resource to be transferred is an inbound and/or an outbound resource, a scheduled time for the resource transfer, an event identification (event ID), whether the resource transfer has been rerouted, or the like. The event identification (event ID) may be any alpha-numeric code that identifies the particular event. It should be appreciated that the term user or entity may refer a person, institution, and/or legal entity (e.g., a corporation) associated with the transfer of resources.

The event data may include the source of the resource transfer and/or the destination of the resource transfer. The source of the resource transfer may be an entity that will initiate transfer of the resource. The destination of the resource transfer may be an entity receiving the resource. The source and/the destination of the resource transfer may be identified via a source ID and/or destination ID. The source ID and/or destination ID may be any alphabetical and/or numeric identifier that identifies the entity transferring (or receiving) the resource. The identifier may include a name, an address (physical or digital), an account number, or the like.

When the instant technology is employed in the financial industry, the event may be associated with an agreement of a first entity to pay the second entity. For instance, the event may be associated with a payment that is made or will be made by a buyer to a supplier. The scheduled time for transferring the resources may be a date that the first entity agrees to pay the second entity. For simplicity, a resource transfer may be described as being transferred between two entities. However, it is contemplated that transferring a financial resource between the two entities may include transferring the financial resource between financial institutions associated with the two entities.

Continuing, the resource indicator may be a digital representation of the amount of resources that will be transferred. The event identification (event ID) may be any identification of the event. In some aspects, the event ID may be invoice number or purchase order number associated with goods or service purchased by an entity. The source ID and/or destination ID may be a person or company name, contact information, or buyer or supplier name/address. As previously stated, the improvements to technologies or the computer provided by this disclosure are not limited to the financial industry. One skilled in the art would recognize that the improvements to how a computer manages and suspends the transfer of resources can be utilized in many different technology areas, including the management of computing resources (e.g., where or when data is transferred so as to be processed), management of telecommunications bandwidth (e.g., where and/or when a network packet is transferred), or management of other physical assets (e.g., transportation network). However, providing examples for each technology area is not reasonable. As such, for the sake of brevity and clarity, the examples described herein employ the technology within the financial industry.

Event data may initially be stored at a user device, user's electronic resource management system, server, or data source. For instance, event data may be stored in a first electronic resource management system associated with a first entity (e.g., electronic resource management system 108a). The event data in the first electronic resource management system may indicate that a resource (e.g., an inbound resource) will be received. Corresponding event data may be stored in a second electronic resource management system associated with the second entity (e.g., electronic resource management system 108b). The event data stored in a second electronic resource management system may indicate that the same event includes transferring a resource (e.g., an outbound resource). Event data may also include a resource indicator that represents the amount of resources to be transferred. For instance, the resource indicator may provide an indication of a packet size (e.g., 1000 bytes), a file size (e.g., 10 megabytes), an amount of financial resources to be transferred (e.g., $1000), an amount of data to be processed (e.g., 100 gigabytes), or the like.

Referring still FIG. 2, user-data collection component 210 may be employed to facilitate the accumulation of user activity and/or event data from the user device, the user's electronic resource management system, a user's server, or a user's data source. User-data collection component 210 may then provide the user activity and/or event data to event detector 260, event modifier 270, or other components or subcomponents of system 200. The data may be received (or accessed), and optionally accumulated, reformatted, and/or combined, by user-data collection component 210 and stored in one or more data stores such as storage 250, where it may be available to the components or subcomponents of system 200. For example, the user activity and/or event data may be stored in or associated with a user profile 240, as described herein. User-data collection component 210 may access or receive (and in some cases also identify) user activity and/or event data from one or more data sources, such as data source 104n of FIG. 1. As explained with respect to FIG. 1, the one or more data sources may be associated or maintained by one or more user devices, such as user device 102n of FIG. 1, one or more electronic resource management systems, such as electronic resource management system 108n, and/or a server, such as server 106.

Additionally or alternatively, the user-data collection component 210 may access or receive user activity and/or event data from user-related communications, including sent or received communications (e.g., SMS texts, email, which may include attachments or dynamic content, telephone conversations, voicemail, IMs, chats, or other communication messages); or interactions with a web-based interface (such as a user interacting with a website); computer application or mobile app activity; purchase or transaction activity (such as invoices or purchase order confirmations). In some embodiments, the user activity may comprise information from multiple communications, which may be across different communication channels (e.g., email, text, voice call, or other communication channels). In some embodiments, user consent may be received before giving user-data collection component 210 access to the user's communications and/or event information.

In some embodiments, user-data collection component 210 receives or accesses event data continuously, periodically, as it becomes available (such as when made available by a particular user), or as needed. User-data collection component 210 may utilize one or more electronic communications between one or more computing devices to gather information associated with an event, including information associated with suspending the event.

Event detector 260 is generally responsible for detecting whether events qualify, or are eligible, for suspension. Event detector 260 can analyze user activity and/or event data and generate an indication or a record specifying that the event is eligible for suspension. The indication or record may comprise event data that identifies the particular event, information about the particular event, an indication that one or more entities associated with the resource transfer have indicated that the event is approved for suspension, and/or an indication that one or more entities have provided parameters for suspending the event (e.g., a resource indicator threshold setting and/or a suspension time threshold setting). In some embodiments, the indication or record indicating that an event is eligible for suspension may be stored in storage 250 or in a user profile associated with the entity, such as user profile 240. In some embodiments, the event detector 260 determines that an event qualifies for suspension if there is an indication that each entity associated with the event has approved the suspension of the event and/or has provided parameters for suspending the event (also referred to as "event suspension parameters").

For example, suppose an entity, such as a supplier, indicates that a particular event is approved for suspension. The user-data collection component 210 may receive an indication that the event is approved for suspension, such as through an electronic communication from a user device. In some embodiments, the indication that the event is approved for suspension may then be accessed by event detector 260 in order to determine if other entities associated with the same event have provided an indication that the event is approved for suspension, such as a buyer's indication that the event is approved for suspension, which may also be received by user-data collection component 210. Event detector 260 may also determine if one or more entities have provided event suspension parameters that can be considered while suspending the event. Based on an indication of approval or event suspension parameters, or combination thereof, the event detector 260 may determine that the event is eligible for suspension. As discussed in greater below, the event modifier 270 may utilize the indication that the event qualifies for suspension provided by event detector 260 in order to determine whether the event should be suspended and whether event data should be modified. For the sake of clarity, even though an event is eligible for suspension, as determined by event detector 260, event modifier 270 may not determine to suspend the event.

As shown in example system 200, the event detector 260 comprises data and communication monitor 262, suspension approval determiner 264, event suspension parameter determiner 266, and event eligibility determiner 268. Data and communication monitor 262 (hereinafter "activity monitor 262"), in general, is responsible for monitoring user activity and/or event data. Activity monitor 262 may also inform an entity that it is associated with an event for which another entity has provided an indication of suspending. Activity monitor 262 may solicit information (e.g., user approval and/or parameters for suspending the event) from users and provide that information to other components, such as suspension approval determiner 264 and/or event suspension parameter determiner 266. Activity monitor 262 may access or receive user activity and/or event data from user-data collection component 210 or from storage 250, such as from user profile 240, and analyzes user activity and/or event data to determine if a user is associated with an event that a different user has identified or approved for suspension. In some embodiments, activity monitor 262 may comprise a computer application or service running on a user client device (i.e., a user device), server, electronic resource management system, the cloud, or some combination thereof (e.g., distributed). It should be appreciated that the user receiving the resources and/or the user transferring resources may initiate the suspension the event. As explained below, a communication may generated and transmitted to one or more users that are determined to be associated with the event to be suspended.

If one user approves the suspension of an event, activity monitor 262 can determine whether another user approval is needed for the suspension of the event. To determine if another user's approval is needed, activity monitor 262 may analyze whether an event is relevant to a particular user. An event may be relevant to one or more users if the user is invited, included, listed, involved, or associated with a particular event. An event may be relevant to a particular user based on event data and/or user-related data identifying that the particular user is associated with a resource transfer, such as through a source ID or destination ID. If a supplier indicates that an event is approved for suspension, the event may be relevant to a buyer. Alternatively, if a buyer indicates that an event is approved for suspension, the event may be relevant to the supplier. Additionally or alternatively, a particular user, such as a rerouting entity, may decide to be associated with (e.g., participate in) the suspension of an event as described in greater detail below with respect to the resource router 276.

Based on determining that an event is relevant to a particular user, activity monitor 262 may generate a communication to solicit information from the user. For example, the activity monitor 262 may request that the user provide an approval for suspending the event and/or parameters for suspending the event. The user may, in turn, provide this information to activity monitor 262 via the user-data collection component 210. Activity monitor 262 can then provide this information to suspension approval determiner 264 and/or event suspension parameter determiner 266.

As shown in system 200 of FIG. 2, event detector 260 comprises suspension approval determiner 264. Suspension approval determiner 264 is generally responsible for determining whether the suspension of the event has been approved, for example, by one or more entities. Because the event is associated with the transfer of resources, an entity associated with the resource transfer may approve the suspension of the event in order to delay the transfer of the resource. The entity transferring the resource may determine that it is willing to increase (or decrease) the amount of resources to be transferred in exchange for delaying the resource transfer. As for the entity receiving the resource, it may approve the suspension of the event in order to receive an increased (or decreased) amount of resources. In some embodiments, an indication of an entity's approval may be stored in storage 250, for example in association with user profile 240. In some instances, suspension approval determiner 264 determines that each entity associated with the event has approved the suspension of the event.

In some embodiments, suspension approval determiner 264 determines that there is an indication that an event is approved for suspension based on receiving event data. For example, the entity may provide event data for one or more events that are approved for suspension. In some aspects, suspension approval determiner 264 may determine that an event is approved for suspension based on receiving an electronic communication including a data file (e.g., an XML file, Microsoft Excel® file, or Comma-Separated Values file) comprising event data associated with one or more resource transfers.

As a further example, an entity may provide an indication of approval by selecting (e.g., via a selectable indicia) one or more events to suspend. For instance, information about one or more events may be provided for display within an electronic resource management system and/or a network-based portal (e.g., an online portal). The electronic resource management system and/or web-based portal may allow an entity to select particular events to suspend. The user's selection may then be received by system 200, such as via user-data collection component 210 and/or activity monitor 262.

In another example, an indication of approval may be based on criteria that specifies which events are approved for suspension. The criteria may be provided or adjusted by the entity. The criteria may specify that events satisfying a particular threshold for an amount of resources being transferred may be approved for suspension. The criteria may specify that events satisfying a particular temporal threshold may be approved for suspension, such as events that are scheduled within or beyond one or more particular scheduled dates. In some aspects, the events satisfying the criteria may be determined to be approved for suspension. Additionally or alternatively, a communication (e.g., a notification) may be provided to entity identifying of events satisfying the criteria. The entity may then respond to the communication and indicate an approval of the suspension of the event. In some embodiments, the criteria may specify that events associated with a particular entity may be approved for suspension. For instance, a first entity may specify that one or more resource transfers involving a second entity are approved for suspension. Additionally or alternatively, a first entity may specify that all of the events associated with a second entity are approved for suspension.

When the technologies are utilized in the financial industry, a first entity may identify a particular buyer that has purchased goods or services. In some embodiments, suspension approval determiner 264 may analyze event data to determine that one or more events are associated (e.g., involve) a particular buyer. It should be appreciated that the event may be associated with a future payment from the buyer to the supplier. Based on determining that one or more events are associated with the particular buyer, suspension approval determiner 264 may store an indication that the first user as approved the one or more events for suspension. In one embodiment, each of the events associated with a particular user may be determined to be approved.

Additionally or alternatively, suspension approval determiner 264 may store an entity's approval in association with an event ID. The event ID may be based on information within event data or an alpha-numeric code generated by the suspension approval determiner 264. By way of example and not limitation, the event ID may include a particular user name, a company name or address, resource indicator, time of event (e.g., a scheduled time for the resource transfer), account number, invoice number, purchase order number, date of invoice or purchase order, a transaction number, and/or the like.

In some embodiments, suspension approval determiner 264 may determine to solicit an indication of approval from entities associated with the event. In some embodiments, in response to determining that an event is approved by an entity, the suspension approval determiner 264 may coordinate with the activity monitor 262 and/or user-date collection component 210 so as to generate an electronic communication that may be communicated to the other entities to obtain their approval to suspend the event. As described in greater detail with respect to the resource router 276, in some embodiments, entities associated with the event may invite or solicit other entities to be associated with the event, for example, so as to reroute the resource. Additionally or alternatively, the other entities may request to participate in the event.

Event suspension parameter determiner 266, in general, is responsible for determining if one or more event suspension parameters have been provided for suspending an event. For instance, event suspension parameter determiner 266 may determine if an entity associated with the resource transfer has provided one or more event suspension parameters for suspending the event. In some embodiments, event suspension parameter determiner 266 may determine that each entity associated with the event has provided one or more event suspension parameters for suspending the event. The one or more event suspension parameters may be provided (e.g., defined, configured, or set) by an entity, for example, through user activity.

Event suspension parameters generally refers to any information, ranges, or qualifications for suspending an event. In some aspects, the event suspension parameters may be relied upon (e.g., by event modifier 270) to determine how to suspend the event. For example and not by limitation, event suspension parameters may include a particular threshold of time for suspending an event (e.g., a time period for suspending the event or a particular date until which an event can be suspended) or a particular threshold for the amount of resources that will be transferred if an event is suspended (e.g., an increase or decrease in resources, a total amount of resources transferred, or a rate of change in the resources transferred), or other parameters for suspending the event.

An entity may provide event suspension parameters, such as resource indicator threshold setting 246 and suspension time threshold setting 248, that can be considered while suspending the event.

Some embodiments of event suspension parameter determiner 266 may also generate an indication or a record identifying the event and the one or more event suspension parameters for suspending that event. For example, event suspension parameter determiner 266 may receive, from suspension approval determiner 264, information for a particular event (e.g., event ID or event data). In turn, event suspension parameter determiner 266 may store one or more event suspension parameters in association with the event ID or event data.

It should be appreciated that an entity may provide event suspension parameters that are specific to the suspension of an individual event and/or event suspension parameters that are specific to a group of events. For instance, in some aspects, event suspension parameter determiner 266 may determine that suspending a first event is regulated by one or more first event suspension parameters while suspending a second event is regulated by one or more second event suspension parameters. Similarly, event suspension parameter determiner 266 may determine that suspending a first group of events is regulated by one or more first event suspension parameters while suspending a second group of events is regulated by one or more second event suspension parameters.

As mentioned, the suspension of the event may involve increasing or decreasing the amount of resources. The event suspension parameters may include a minimum and/or a maximum threshold for the amount of resources that will be transferred if the event is suspended. In some instances, an event suspension parameter may include a range between a minimum and/or maximum threshold of resources that will be transferred if an event is suspended. Values for these thresholds can be stored in storage 250, such as in association with resource indicator threshold setting 246. Resource indicator threshold setting 246 may be configured via an electronic resource management system (such as electronic resource management system 108a) or one or more user devices (such as user device 102a), servers (such as server 106), and/or other computing devices.

Resource indicator threshold setting 246 may be configured on a per event basis or across a set of events. In some embodiments, resource indicator threshold setting 246 may be applied to a set of events having a common attribute, such as a set of events associated with a particular entity, a set of event associated with a particular time for transferring the resources, or any other event data. The resource indicator threshold setting 246 may be based on an amount of increase/decrease of the resources transferred, a total amount of the resources transferred, a rate of increase/decrease of the resources transferred, a percentage of increase/decrease in resources, a range between a minimum or maximum threshold, and/or other indications of an amount of resources that will be transferred. In some embodiments, a particular user may configure the resource indicator threshold setting 246 to indicate that a larger (or greater) amount of resources are required to suspend the event. In some embodiments, a particular user may configure the resource indicator threshold setting 246 to indicate that a smaller (or lesser) amount of resources are required to suspend the event.

When the instant technologies are employed in a financial industry, the resource transfer may relate to financial resources that will be transferred to satisfy a financial between one or more entities. For example, the resource transfer may be associated with a payment to reconcile an invoice or bill. In some embodiments, the resource indicator threshold setting 246 may be configured such that an entity can designate a minimum or maximum increase (or decrease) in the financial resources if the event is suspended and/or a total amount of financial resources that will be transferred if the event is suspended. The resource indicator threshold setting 246 may be include a particular currency or a percentage of increase (or decrease) in resources as measured with respect to time, such as an APR. For instance, an entity may configure a range of a minimum to maximum threshold of a 6% to 8% APR return.

A suspension time threshold setting 248 may also be stored in association with a user profile 240. The suspension time threshold setting 248 may be a minimum and/or a maximum threshold of time for suspending an event. Suspension time threshold setting 248 may be provided (e.g., defined, configured, or set) by an entity. In some instances, an entity may provide a range between a minimum and/or maximum threshold of time for suspending the event. Suspension time threshold setting 248 may be configured via an electronic resource management system (such as electronic resource management system 108*a*) or one or more user devices (such as user device 102*a*), servers (such as server 106), and/or other computing devices. The suspension time threshold setting 248 may be configured on event-specific basis or across a set of events.

In some embodiments, suspension time threshold setting 248 may be applied to a set of events having a common attribute, such as a set of events associated with a particular entity, a set of events associated with a particular amount of resources that are transferred (e.g., amount due with respect to time), or any other event data. The suspension time threshold setting 248 may be provided using a particular number of days, months, years, a particular date (e.g., Aug. 9, 2020), or any other suitable time period.

As described herein, the event may be associated with a time in which resources will be transferred so as to reconcile the event. When the instant technologies are employed in a financial industry, the event may be associated with financial resources that are transferred between two entities and the time that the financial resources will be transferred. The time may include a date on which the financial resources will be transferred. In some embodiments, the user may provide a minimum or maximum amount of time (e.g., via suspension time threshold setting 248) to suspend the payment, such as suspending the transfer financial resources from a range between forty-five to ninety days.

Event eligibility determiner 268 generally determines if an event is eligible for suspension. An event may be eligible for suspension based on one or more entities approving the suspension of the event. In some aspects, an event is eligible if each entity associated with the event has approved the suspension of the event. For example, if a first entity is transferring resources to a second entity, event eligibility determiner 268 may determine that an event is eligible for suspension if both the first entity and the second entity have approved the suspension of the event. Continuing with examples in the financial industry, if a first entity (e.g., a buyer) has purchased goods or services from a second entity (e.g., a supplier) and the first entity is transferring a financial resource to the second entity, event eligibility determiner 268 may determine that an event is eligible for suspension if both the first entity and the second entity have approved the suspension of the event In some aspects, an event may be eligible based on determining that event suspension parameters for suspending the event have been provided by one or more entities. For example, event eligibility determiner 268 may determine if a resource indicator threshold setting 246 and/or a suspension time threshold setting 248 (or a combination thereof) have been provided by one or more entities. In some aspects, event eligibility determiner 268 determines that an event is eligible based on determining that each entity associated with the event has provided event suspension parameters. Continuing with the example above, event eligibility determiner 268 may determine that an event is eligible if both the first entity and the second entity have provided event suspension parameters for the suspending the event. If an event is eligible for suspension, the event may be considered by event modifier 270, which may determine whether to suspend the event.

System 200 may include an event modifier 270. Event modifier 270, in general, is responsible for determining whether to suspend the event, information about how the event should be suspended, and instructing one or more electronic resource management systems to modify event data. At a high level, event modifier 270 may utilize the information provided by the event detector 260 (e.g., user activity, event data, and/or the one or more event suspension parameters) to determine if an event should be suspended, and if so, generate new event data associated with suspending the event, such as an increase (or decrease) of resources to be transferred and/or a time in which the resource transfer will occur. Event modifier 270 may obtain the determinations of the event detector 260, user activity, event data, and/or the one or more event suspension parameters from event detector 260, user-data collection component 210, and/or storage 250 (e.g., user profile 240). The event modifier 270 can determine to suspend the event and then initiate the modification of information about the event in electronic resource management systems and/or computing devices. For instance, event modifier 270 may instruct electronic resource management systems and/or computing devices to include new event data (e.g., modify existing event data and or generate new event data). As described herein, entities conventionally utilize non-integrated or disparate electronic resource management systems to maintain data associated with an event. This presents technological problems since modifications to event data in one electronic resource management system are not reflected in another electronic resource management system. In addition to other components of system 200 (e.g., event detector 260 and electronic resource management system modifier 280), event modifier 270 may assist in overcoming technological problems associated with whether data in non-integrated or disparate electronic resource management systems or computing devices should be modified.

Event suspension engine 271, in general, is responsible for determining to suspend the event. Event suspension engine 271 may determine to suspend an event if one or more event suspension parameters are satisfied. In some aspects, event suspension engine 271 may determine to suspend an event if can be aggregated with other events so as to satisfy one or more event suspension parameters. Additionally or alternatively, event suspension engine 271 may determine to suspend an event if the resources can be rerouted. Event suspension engine 271 may then communicate a determination that an event is suspended and information about how an event is suspended to other components of event modifier 270, such as suspended event compiler 278 and/or resource management software instructor 279. Event suspension engine 271 may also store its determinations in storage 250 or communicate it to other components of FIG. 2.

Resource indicator determiner 272, in general, is responsible for determining whether an event can be suspended based on modifying an amount of resources that will be transferred. Resource indicator determiner 272 may then determine a resource indicator so as to reflect that change. For instance, resource indicator determiner 272 may determine that in order to suspend the event from a first scheduled time to a second scheduled time, a first resource indicator associated with the first scheduled time should be modified to a second resource indicator associated with the second scheduled time.

When the instant technologies are employed in a financial industry, the resource indicator may be a representation (e.g., a digital representation) of an amount due to fulfill a financial agreement between two parties. For example, the resource indicator may be a digital representation of an amount of financial resources a first entity (e.g., a buyer) will transfer to a second entity (e.g., a supplier). Resource indicator determiner 272 may determine whether an event can be suspended based on determining a new amount of resources that need to be transferred if an event is going to be suspended. The new amount of resources may be an amount that exceeds (or is below) the amount of financial resources that the first entity was going to transfer to the second entity if the event was not suspended. In some embodiments, resource indicator determiner 272 may determine a payment amount that exceeds the amount stored in disparate electronic resource management systems, such as a buyer's electronic resource management system and/or a supplier's electronic resource management system.

In some embodiments, resource indicator determiner 272 may utilize resource logic 230 to determine the amount of resources that should be transferred so as to suspend the event. More particularly, resource indicator determiner 272 may utilize resource logic 230 to determine an amount of additional (or fewer) resources that can be transferred so as to suspend the event. Additionally or alternatively, resource indicator determiner 272 may utilize resource logic 230 to determine a minimum and/or maximum amount of resources that can be transferred so as to suspend the event.

Resource logic 230 generally comprises a set of logic, rules, conditions, associations, or classification models, which may include one or more machine learning (ML) classification models, or other criteria, that can be used to determine how much additional (or fewer) resources that can be transferred in order to suspend an event. Resource logic 230 may also include logic that determines how a resource indicator(s) should be modified to reflect the additional resources (or fewer resources). As explained below, in some embodiments, resource logic 230 may comprise instructions to determine an amount of additional (or fewer) resources that can be transferred so as to suspend the event based on using a one or more entities' resource threshold. The resource threshold may be a threshold for increasing (or decreasing) the amount of resources transferred, a particular rate of increase (or decrease) in resources over time, and/or a threshold for a total amount of resources transferred. Resource logic 230 may also comprise instructions determine the amount of resources to be transferred based on resource thresholds from other entities having similar attributes as the entities involved in the event (e.g., entities within the same industry, similar size of company, similar geographic region), information about an entity's previous events or resource thresholds, or the like. Information about an entity's previous events may include how often the entity participates in the service provided by system 200, historic information for the amount of resources typically suspended, historic information about average increase (or decrease) in the amount of resources transferred, or other historic event information.

Resource logic 230 may comprise logic to determine whether a resource threshold (such as resource indicator threshold setting 246) is satisfied. In some embodiments, a first entity may provide a minimum and/or maximum resource threshold for increasing (or decreasing) the amount of resources. A second entity may also provide a minimum and/or maximum resource threshold for increasing (or decreasing) the amount of resources. The resource logic 230 may comprise logic to determine that suspending the event may include transferring an amount of resources so as to satisfy the minimum resource threshold set by the first entity (e.g., the amount of resources would at least meet or exceed the minimum resource threshold) and/or satisfy the maximum resource threshold set by the second entity (e.g., the amount of resources would meet or fall below the maximum resource threshold). In some embodiments, the resource logic 230 may comprise logic to determine an amount in a range from about the minimum resource threshold of the first entity to about the maximum resource threshold of the second entity. For instance, the resource logic 230 may comprise logic to determine an amount equal to the minimum resource threshold, an amount equal to the maximum resource threshold, or an amount between the minimum and maximum resource thresholds provided. In some embodiments, the resource logic 230 may comprise logic to determine an amount utilizing either the first and/or second entity's minimum and/or maximum resource threshold (e.g., a total amount of resources transferred or change in resources transferred), an average of the first and/or second entity's minimum and/or maximum resource threshold (e.g., a total amount of resources transferred or change in resources transferred), or some other predetermined calculation.

It should be appreciated that, in some aspects, resource logic 230 may not utilize the first or second entity's minimum and/or maximum resource threshold. Additionally or alternatively, resource logic resource logic 230 may utilize a learned minimum and/or maximum resource threshold. For example, resource logic 230 may utilize a minimum and/or maximum resource threshold that is learned from facilitating a resource transfer between similar entities or for similar events. Flexibility in determining an amount of resources needed suspend the event may be advantageous as resource logic 230 may rely on other factors to determine the amount of resources to be transferred, such as an amount of resources needed to achieve a particular rate of increase (or decrease) over a particular period of time, statistical information about resource transfers between entities having similar attributes as the entities actually associated with the event, information about previous events that have been suspended (such as previous suspended events that the entities were associated with), or the like. The resource logic 230 may be utilized to provide an amount of resources that should be transferred if the event is suspended. In some aspects, resource logic 230 may be utilized to provide a resource indicator to reflect the determined amount of resources that will be transferred.

Continuing with examples of when the instant technology is employed in the financial industry, the first entity may provide a minimum resource threshold for increasing (or decreasing) an amount resources to be transferred, which may represent a minimum payment that is above the cost for goods or services purchased by a second entity. The second entity may provide a maximum resource threshold that limits the amount of resources to be transferred, which may represent a maximum amount of resources to be transferred above the cost of goods or services that it is willing to pay. Resource logic 230 may comprise logic to determine an amount of resources that will be transferred that satisfies the minimum resource threshold provided by the first entity and the maximum resource threshold set by the second entity.

Suspension time determiner 274, in general, is responsible for determining whether an event can be suspended based on rescheduling the resource transfer. In some embodiments, suspension time determiner 274 may determine that the event can be suspended if the resource is transferred at a newly scheduled time. The newly scheduled time may be after the scheduled time associated with the non-suspended event. For example, suspension time determiner 274 may determine suspending the event may include suspending (e.g., delaying) the resource transfer from a first time (which may be associated with a non-suspended event) to a second time (which may be associated with the suspended event). In some aspects, suspension time determiner 274 may determine to suspend the event such that resources will be transferred at a second scheduled time as opposed to the first scheduled time, where the second scheduled time is after the first scheduled time. In some embodiments, suspension time determiner 274 may determine a time other than that which is stored in disparate electronic resource management systems, such as a first entity's electronic resource management system and/or a second entity's electronic resource management system.

Continuing with example technologies employed in the financial industry, the time of event may relate to a day financial resources are to be transferred between one or more entities. Suspension time determiner 274 may determine to suspend the due date of a payment from a first scheduled date to a second scheduled date. Additionally or alternatively, suspension time determiner 274 may determine how long to suspend (e.g., delay) the date of the resource transfer. In some embodiments, suspension time determiner 274 may determine a resource transfer date other than that which is stored in disparate electronic resource management systems, such as a first entity's (e.g., buyer's) electronic resource management system and/or a second entity's (e.g., supplier's) electronic resource management system.

Suspension time logic 232 generally comprises a set of logic, rules, conditions, associations, or classification models, which may include one or more machine learning (ML) classification models, or other criteria, that can be used by suspension time determiner 274 to determine a scheduled time for transferring the resources. In some aspects, suspension time logic 232 includes criteria for determining a time period for how long an event should be suspended. In some aspects, a scheduled date (or a length of time to suspend the event) can be determined based on user or client-device configurable scheduled time for suspending the event (such as via suspension time threshold setting 248). As explained below, in some embodiments, suspension time logic 232 may comprise instructions to determine a scheduled time for transferring the resources based on a minimum and/or maximum suspension time thresholds. The minimum suspension time threshold may be the earliest date or shortest length of time that the event can be suspended. The maximum suspension time threshold may be the latest date or longest length of time that the event can be suspended. In some embodiments, suspension time logic 232 may comprise instructions to determine a scheduled time for transferring the resources between a minimum and/or maximum suspension time thresholds or some other predetermined calculation. One or more entities may provide either or both a minimum suspension time threshold and maximum suspension time threshold. It should be appreciated that the length of time may be measured by the number of seconds, hours, days, weeks, months, or other suitable periods of time.

Suspension time logic 232 may comprise instructions to determine a scheduled time utilizing one or more entities' suspension time thresholds for suspending the event, an amount of time to achieve a particular rate of increase (or decrease) in resources over time, statistical information about entities having similar attributes as the entities associated with in the event (e.g., entities within the same industry, similar size of company, or similar geographic region), information about an entity's previous events, or the like. Information about an entity's previous events may include how often the entity participates in the service provided by system 200, historic information for how long events are typically suspended, or other historic event information.

In some embodiments, a first entity may provide a minimum and/or maximum suspension time threshold for suspending an event. Similarly, a second entity may provide a minimum and/or maximum suspension time threshold for suspending the event. The suspension time logic 232 may comprise logic to determine that the event should be suspended a particular amount of time or until a particular scheduled time so as to satisfy the minimum and/or maximum suspension time threshold set by the first entity and/or satisfy a minimum and/or maximum suspension time threshold set by the second entity. The suspension time logic 232 may then comprise logic to determine a time in a range from about the minimum suspension time threshold associated with first entity to about the maximum suspension time threshold associated with the second entity. For instance, the suspension time logic 232 may comprise logic to determine to suspend the time of the event such that it is equal to an entity's minimum suspension time threshold, an amount equal to an entity's maximum suspension time threshold, or an amount between an entity's minimum and maximum suspension time threshold. In some embodiments, suspension time logic 232 may comprise logic to determine a scheduled date (or a length of time to suspend the event) utilizing either or both the first and second entity's minimum and/or maximum suspension time threshold, an average of the first and/or second entity's minimum and/or maximum suspension time threshold, or some other predetermined calculation.

It should be appreciated that suspension time logic 232 may not utilize the first or second entity's minimum and/or maximum suspension time threshold. Additionally or alternatively, suspension time logic 232 may utilize a learned minimum and/or maximum suspension time threshold. In some aspects, resource logic 230 may utilize a minimum and/or maximum suspension time threshold for similar entities or for similar events. Suspension time logic 232 may include logic having any predetermined calculation for determining a new date or time for the event if the event is to be suspended. Providing flexibility in determining how long to suspend the event may be advantageous because other factors may be considered, such as an amount of time needed to achieve a particular rate of increase (or decrease), statistical information about how long events have been suspended for entities having similar attributes as the entities actually associated with the event, information about how long previous events that have been suspended (such as previous suspended events that the entities were associated with), or the like. The resource logic 230 may be utilized to provide a newly scheduled time which the event should be scheduled. For instance, the resource logic 230 may be utilized to provide a newly scheduled time which an amount of resources should be transferred. In some aspects, resource logic 230 may provide a date to reflect when resources will be transferred.

Continuing with example technologies employed in a financial industry, the first entity, may provide a minimum and/or maximum suspension time threshold for suspending a payment date for goods or services purchased by a second entity. The second entity may also provide a minimum and/or maximum suspension time threshold for suspending payment date. Suspension time logic 232 may include logic that determines a day or time for suspending a payment date that satisfies one or more of the entities' minimum and/or maximum suspension time thresholds. For instance, if the first entity sets a threshold range of suspending the payment date between fifteen to thirty days and the second entity sets a threshold range between twenty to forty-five days, suspension time logic 232 may include logic that determines suspending the payment date between twenty to thirty days.

It should be appreciated that the event modifier 270 may also receive a minimum and/or maximum suspension time threshold to achieve a rate of increase (or decrease) of resources. For instance, the event modifier 270 may receive a minimum and/or maximum suspension time threshold of forty-five days to achieve a rate of resource increase (or decrease) of 8% from the first entity and/or the second entity. Suspension time logic 232 may comprise logic to cause suspension time determiner 274 to coordinate with resource indicator determiner 272 to determine a particular scheduled date to achieve the rate of resource increase (or decrease) in the amount of resources that will be transferred.

Event aggregator 275, in general, is responsible for determining whether a particular combination of events (or all of the events) can be suspended based on a particular set of events. Event aggregator 275 may determine that an entity has provided a set of events and requested that one or more of those events be suspended based on satisfying an aggregated threshold. Event aggregator 275 may then determine which events (if any) can be suspended based on satisfying an aggregated resource threshold and/or an aggregated suspension time threshold. It should be appreciated that, in some embodiments, suspending the first event and/or second event may not have individually satisfied a resource threshold. However, by aggregating the events, event aggregator 275 may suspend an event that might not have otherwise been suspended on an individual basis.

Event aggregator 275 may determine that a combination of events may be suspended based on satisfying an aggregated event suspension parameter(s). The aggregated event suspension parameters may include an aggregated resource threshold and/or an aggregated suspension time threshold. In some aspects, an entity may configure the aggregated resource threshold and/or the aggregated suspension time threshold (e.g., via resource indicator threshold setting 246 and/or suspension time threshold setting 248). An entity may also provide a set of events to be suspended. The set of events may be separate events that occur at the same time or at different times (e.g., different days). Additionally or alternatively, the set of events may be events associated with the same or different entities. Event aggregator 275 may then determine if one or more of the events can be suspended based on satisfying an aggregated resource threshold and/or aggregated suspension time threshold. Event aggregator 275 may utilize aggregation logic 234 to suspend a particular combination of events.

For example, a first entity may provide an aggregated event suspension parameter(s) for suspending a first, second, and third event. A second and third entity may provide an aggregated event suspension parameter(s) for suspending the second and third event, respectively. Event aggregator 275 may determine that suspending the second and third event may satisfy the aggregated threshold(s) provided by the first entity and/or the second and third event. It should be appreciated that suspending the first event may not have satisfied an aggregated event suspension parameter(s) provided by the first entity or another entity associated with the first event. The event aggregator 275 may therefore determine to suspend the second and third event and not the first event.

It should be appreciated that aggregating events may allow an event to be suspended even though the event might not have been suspended when considered on an individual basis. In other words, the aggregated resource threshold may allow events to be suspended that might not have otherwise been suspended. Continuing with the example above, while suspending the second and third event may satisfy the aggregated resource threshold as a combination, the second and third event may not individually satisfy the aggregated resource threshold. For instance, the increase in resources transferred for the second event may individually fall below a minimum aggregated resource threshold. However, the combination of resource increase for both the second event and third event may satisfy the minimum aggregated resource threshold. As such, the instant technologies allow the second event to be aggregated with a third event such that they both can be suspended. This introduces greater flexibility in managing resources and it improves the computer by allowing it to consider suspending more resources than it might not have otherwise been able to suspend. This is an improvement to the system 200 because there may be a limited set of events that are determined to be eligible for suspension by event detector 260. This may be due in part on the disruption that suspending an event may have on a particular system or entity. Event aggregator 275 may overcome these difficulties by improving the efficiency in suspending events since a greater number of events can be combined to form a suspended set of events even though one or more of the events within the set of events did not individually satisfy a particular threshold.

Continuing with example technologies employed in a financial industry, an entity (such as a supplier or buyer) may provide a set of events that it desires to suspend and define an aggregated resource threshold for suspending a plurality of the events. The entity may configure a minimum/maximum aggregated resource threshold of 6% APR for suspending the events. Event aggregator 275 may determine which events from the set of events can be combined so as to achieve a 6% APR. It should be appreciated that this may include suspending individual events at different increase resource rates, such as first event based on a 4% APR increase and a second event at an 8% APR increase. While the resource increase of first event may not individually satisfy the aggregated resource threshold, the combination of suspending both events can achieve an aggregated resource threshold of 6% APR.

Aggregation logic 234 generally comprises a set of logic, rules, conditions, associations, or classification models, which may include one or more machine learning (ML)

classification models, or other criteria, to determine which events (if any) can be aggregated so as to suspend a group of events. In some embodiments, aggregation logic 234 may comprise instructions to determine how events can be aggregated such that each aggregated event can be suspended.

In some aspects, aggregation logic 234 may comprise instructions to determine an aggregated increase (decrease) of resources transferred for one or more combinations of a set of events. For instance, the increase of resources for a first event can be aggregated with the increase of resources for a second event. It may then be determined whether suspending the transfer of the aggregated amount of resources satisfies an aggregated resource threshold. Based on satisfying the aggregated resource threshold, the first and second event can be suspended.

Aggregation logic 234 may utilize resource thresholds of one or more entities associated with the set of events. Aggregation logic 234 may utilize one or more entity's minimum and/or maximum resource threshold (e.g., a total amount of resources transferred or change in resources transferred), an average of one or more entity's minimum and/or maximum resource threshold (e.g., a total amount of resources transferred or change in resources transferred), or some other predetermined calculation. It should be appreciated that one or more entity's minimum and/or maximum resource threshold may be a resource threshold for an individual event (e.g., a per-event resource threshold) or an aggregated event resource threshold.

In some aspects, aggregation logic 234 may include determining how a particular increase in the resources transferred can satisfy both a first entity's aggregated threshold and the resource threshold(s) set by other entities associated with the event. For example, a supplier may provide an aggregated resource threshold of 5% rate of increase of resources to be transferred for a set of events. The set of events may include a first event associated with a first resource transfer of $20,000 from a first buyer to the supplier, and a second event associated with a second resource transfer of $30,000 from a second buyer to the supplier. Aggregation logic 234 may include instructions to determine that the first event can be suspended based on increasing the resources transferred by $1,200 (which is a 6% increase in resources), which may be based on determining that the 6% increase satisfies a resource threshold provided by the first buyer. Aggregation logic 234 may also include instructions to determine that the second event can be suspended based on increasing the resources transferred by $1,500 (which a 5% increase in resources), which may be based on determining that the increase of 5% satisfies a resource threshold configured by the second buyer.

It should be appreciated that the set of events may or may not be associated with the same entity(ies). For example, an entity (e.g., a supplier) may provide a set of events associated with receiving financial resources from different entities (e.g., buyers). Aggregation logic 234 may comprise instructions to aggregate events associated with a first entity transferring the resources to the entity with events associated with second entity that is also transferring the resource to the entity so as to achieve an aggregated resource threshold. As a further example, an entity (e.g., a buyer) may provide a set of events associated with transferring financial resources to different entities (e.g., suppliers). Aggregation logic 234 may comprise instructions to aggregate events associated with a first entity transferring a resource to the entity with events associated with second entity transferring a resource to the entity so as to achieve an aggregated resource threshold.

Aggregation logic 234 may comprise instructions for determining the time period for suspending each aggregated event. Aggregation logic 234 may utilize an aggregated suspension time threshold. The aggregated suspension time threshold is similar to the suspension time threshold described herein, as such further details are not provided here. The aggregated suspension time threshold may be one or more thresholds provided for the set of events. The aggregated suspension time threshold may be a single threshold for the set of events. For instance, the set of events can be suspended up to ninety days. Additionally or alternatively, the aggregated suspension time threshold may be a plurality of thresholds for the set of events. For instance, one or more aggregated suspension time thresholds may be applied to particular entities and/or a particular amount of resources that will be transferred.

More particularly, aggregation logic 234 may have instructions to determine if suspending one or more of the events from the set of events satisfies an aggregation suspension time threshold. For instance, aggregation logic 234 may comprise instructions to determine whether an event from the set of events can be suspended from a first time (e.g., where first time is associated with the original, non-suspended event) to a second time (e.g., where each second time is associated with the suspending event).

It should be appreciated that the set of events provided by an entity may include events that will occur at the same or different times. For instance, set of events provided by an entity may include a first event that is scheduled to occur at a particular calendar day (e.g., Aug. 9, 2020) and a second event that is scheduled to occur at another calendar day (e.g., Aug. 15, 2020). An entity may provide an aggregated suspension time threshold (e.g., via suspension time threshold setting 248) for the set of events. In some aspects, the aggregated suspension time threshold may be a threshold suspension time threshold that is applied on a per-event basis (e.g., each event from the set of events can be suspended between forty-five days to ninety days). In other aspects, the aggregated suspension time threshold may be a single threshold suspension time threshold that is applied to the set of events (e.g., the set of events cannot be suspended beyond Oct. 9, 2020).

It should be appreciated that event aggregator 275 may communicate with suspension time determiner 274 to determine if each of the aggregated events can be suspended based on satisfying one or more entity's suspension time thresholds. As such, further details about determining whether an event satisfies an aggregated suspension time threshold is provided with respect to suspension time determiner 274 and suspension time logic 232.

Resource router 276, in general, is responsible for determining whether the resource transfer associated with an event can be rerouted. If resources can be rerouted, resource router 276 may generated one or more rerouting events that are associated with rerouting resources through a rerouting user or rerouting user device (both of which may be referred to as a rerouting entity). The one or more rerouting events may occur in place of (or in addition to) the original, non-suspended event.

Resource router 276 may generate one or more rerouting events by modifying which entities are receiving and transferring resources and/or modifying the amount of resources transferred between each entity. For example, an unsuspended event may include transferring a resource from a first to a second entity. Resource router 276 may determine that an event can be suspended based on rerouting the resource through a third entity (also referred to as a rerouting entity).

Resource router 276 may generate a first rerouting event that includes transferring a first amount of resources (e.g., a "first rerouted resource") from the first entity to the rerouting entity. Resource router 276 may generate a second rerouting event that includes transferring a second amount of resources (e.g., a "second rerouted resource") from the rerouting entity to the rerouting entity.

Continuing with example technologies employed in a financial industry, an unsuspended event may be associated with transferring a payment from the first entity, such as a buyer, to a second entity, such as a supplier. An indication may be received from a third entity, such as a financing party, to participate in the suspension of an event. Resource router 276 may determine that the event can be suspended based on generating two or more rerouting events. For instance, resource router 276 may determine that the buyer will provide a payment to the financing party and the financing party will provide a payment to the supplier. In some instances, to suspend the event, the third entity may provide a payment to the supplier at the originally scheduled time that the buyer was going to provide a payment. In other instances, to suspend the event, the financing party may provide a payment to the supplier after the original scheduled time but before the financing party receives a payment from the buyer.

It should be appreciated that resource router 276 may communicate with other components of event modifier 270 (e.g., the resource indicator determiner 272 and/or suspension time determiner 274) to determine the amount of rerouted resources that will be transferred and/or the schedule time for the rerouted events. Resource router 276 may also utilize rerouting logic 236 to determine whether an event can be suspended based on rerouting the resource.

Rerouting logic 236 generally comprises a set of logic, rules, conditions, associations, or classification models, which may include one or more machine learning (ML) classification models, or other criteria, to determine how to generate one or more rerouting events. Rerouting logic 236 may comprise instructions that an event can be suspended if a resource transfer can rerouted through a rerouting entity.

A resource can be transferred through a rerouting entity if an entity provides an indication to participate in the suspension one or more events. The indication may be provided via activity monitor 262 and/or user-data collection component 210. In some aspects, the rerouting entity may provide an indication that is a general approval to be associated (e.g., participate) with any event being suspended. The indication may be associated with a request from a rerouting entity to be associated (e.g., participate) in any event so long as one or more event suspension parameters (e.g., a resource indicator threshold setting 246 and a suspension time threshold setting 248) provided by the rerouting entity are satisfied. If event suspension parameters are satisfied the rerouting entity may have an opportunity to confirm the suspension of the event. It is contemplated that the rerouting entity does have an opportunity to confirm the suspension of the event if one or more event suspension parameters provided by the rerouting entity are satisfied.

Rerouting logic 236 may comprise instructions to determine that an event can be suspended based on satisfying the one or more event suspension parameters provided by the rerouting entity and/or the event suspension parameters of one or more entities associated with the unsuspended event. By way of example, an unsuspended event(s) may be associated with the transfer of a resource from a first entity to the second entity. The event may be suspended based on determining to separate the event into one or more rerouting events. The one or more rerouting events may include separating the resource transfer into one or more rerouted resource transfers. Rerouting logic 236 may provide instructions to determine that the first rerouting event satisfies one or more event suspension parameters received from the first entity and/or the rerouting entity. Rerouting logic 236 may also provide instructions to determine that the second rerouting event satisfies one or more event suspension parameters received from the second entity and/or the rerouting entity. Further details about satisfying one or more event suspension parameters are described above with respect to resource indicator determiner 272, suspension time determiner 247, and/or event aggregator 275.

It should be appreciated that the one or more rerouting events may be scheduled to occur at different times. The first rerouting event may be scheduled to occur before or after the second rerouting event. In some instances, the second rerouting event will be scheduled to occur before the first rerouting event. Specifically, the rerouting entity may transfer a resource to the second entity prior to receiving a resource from the first entity. This may occur, for example, if the second entity decides to receive a resource before the first entity decides to provide the resource. The rerouting entity may "bridge the gap" by providing a second rerouted resource to the second entity prior to (or after) receiving a first rerouted resource from the first entity. This is may introduce greater flexibility into system 200 since the second entity may not be able to suspend the event as long as the first entity would like.

It should also be appreciated that the first rerouting event may include increasing (or decreasing) the amount of resources transferred (e.g., when compared to the amount of resources transferred without suspending the event). Additionally or alternatively, the second rerouting event may include increasing (or decreasing) the amount of resources transferred (e.g., when compared to the amount of resources transferred without suspending the event). In some embodiments, the second rerouting event may include the same amount of resources if the second rerouting event is scheduled to occur at the same time as the initial, unsuspended event (e.g., the initially scheduled time associated with the resource transfer from the first entity to the second entity).

This improves the flexibility of the system 200 to suspend a greater number of events since it may allow events to be suspended that may not have otherwise been suspended. There may be a limited set of events that are determined to be eligible for suspension by event detector 260 because of the disruption that suspending an event may have on a particular system or entity. Resource router 276 may overcome these difficulties by improving the efficiency in suspending events since a greater number of events can be suspended based on rerouting a resource.

Event suspension determiner 277 generally determines to suspend an event based on the one or more determinations of the resource indicator determiner 272, suspension time determiner 274, event aggregator 275, and/or resource router 276. In some aspects, event suspension determiner 277 will determine to suspend an event based on increasing (or decreasing) the resources transferred (as determined by resource indicator determiner 272) and/or suspending event until a scheduled time (e.g., as determined by suspension time determiner 274). It is contemplated that the term "suspend" may include delay (e.g., postpone or reschedule). Although aspects of this disclosure may include descriptions regarding "transferring resources" it is contemplated that in some embodiments, an actual transfer may not occur, but rather an operation updating an indication of resources or resource allocation may be performed.

For instance, continuing with example technologies employed in a financial industry, a resource indicator threshold setting 246 for the first entity may include a threshold range between 5-8% APR while the suspension time threshold setting 248 for suspending the payment may be between fifteen to thirty days. A resource indicator threshold setting 246 for the second entity may be to receive a threshold range between 6-9% APR while the suspension time threshold setting 248 for suspending the payment may be between twenty to forty days. Event suspension determiner 277 may suspend the event based on the resource indicator determiner 272 determining to increase the resources transferred using a 7% APR and the suspension time determiner 274 determining to suspend the payment for thirty days.

In some aspects, event suspension determiner 277 can determine to suspend a plurality of events based on the one or more determinations of the event aggregator 275. For instance, an entity may indicate that one or more events can be aggregated together so as to be suspended. Event suspension determiner 277 may coordinate with event aggregator 275 to suspend a plurality of events.

In some aspects, event suspension determiner 277 can determine to suspend one or more events based on the one or more determinations of the resource router 276. For instance, an entity may indicate that one or more events be rerouted. Event suspension determiner 217 may coordinate with event aggregator 275 to suspend one or more events based on the availability of the resources of one or more events being rerouted.

In some aspects, event suspension determiner 277 performs a determination based on the occurrence of a triggering event. In some embodiments, the triggering event may include a temporal attribute (e.g., a particular day, a particular time of day). The triggering event may occur periodically, such as a daily, weekly, or monthly. In some aspects, the triggering event may occur daily at a predetermined time. The triggering event may designate a closing of a period of time in which events can qualify for suspension (such as by event detector 260). Additionally or alternatively, the triggering event may designate a closing of a period of time in which suspension threshold settings (e.g., resource indicator threshold setting 246, suspension time threshold setting 248) can be configured by an entity.

In some embodiments, the triggering event may apply to all events considered by system 200. Based on the occurrence of the triggering event, event suspension determiner 277 may communicate with the resource indicator determiner 272, suspension time determiner 274, event aggregator 275, and/or resource router 276 to receive information about which events can be suspended and finalize the suspension of the event.

Suspended event compiler 278, in general, may compile the one or more suspended events that are specific (e.g., relevant) to a particular entity. The suspended event compiler may determine which of the suspended events are associated with a particular entity and then compile the suspended events (along with the event data associated with the suspended event) so as to be provided to a specific entity. For example, all the events associated with a first entity transferring (and/or receiving) a resource may be compiled and provided to the first entity. Suspended event compiler 278 may store an indication of the events to be suspended in a temporary location within computer memory, such as a database of suspended events to be reconciled. Suspended event compiler 278 may then remove the indication of the events to be suspended from the temporary location once resource management software instructor 279 instructs an electronic resource management system to suspend the event, as explained in greater detail below. In some embodiments, suspended event compiler 278 may remove the indication of the events to be suspended from the temporary location to add a record of the suspended event to a long-term location once resource management software instructor 279 instructs an electronic resource management system of the suspended event. Suspended event compiler 278 may thus improve the storage and retrieval of event data to be reconciled across disparate systems.

Suspended event compiler 278 may also store an indication of the suspended event (including event data for the suspended event) in such a way that the event may be retrieved based on the entity associated with the event, whether the resource is an inbound resource transfer, whether the resource is an outbound resource transfer, resource indicators, event ID, a time for suspending the event (e.g., a date in which the suspended resource transfer will occur), or other event information. In some aspects, suspended event compiler 278 may also store an indication of the suspended event in association with a user profile (e.g., user account 242).

Electronic resource management software instructor 279, in general, is responsible for instructing an electronic resource management system (such as electronic resource management system 108*a*) to include information about the suspension of the event so as to reconcile event data across one or more electronic resource management systems. For example, resource management software instructor 279 may communicate with suspended event compiler 278 and/or event suspension engine 271 (or, more particularly, resource indicator determiner 272, suspension time determiner 274, event aggregator 275, resource router 276, and/or event suspension determiner 277) to determine which events have been suspended and information regarding suspending the event (e.g., suspended event data). Resource management software instructor 279 may cause an electronic resource management system to include information about the suspension of the event. For instance, resource management software instructor 279 may instruct an electronic resource management system to modify previously stored data files for the event or generate new data files for the event. Based on determining which events that have been suspended, resource management software instructor 279 may generate instructions including information about the suspension of the event and communicate those instructions to an electronic resource management system associated with one or more entities (and, in some instances, all of the entities) associated with the event.

In some aspects, resource management software instructor 279 may generate instructions that are specific to an entity's electronic resource management system. There may be different and/or disparate electronic resource management systems. Resource management software instructor 279 may account for these differences and generate instructions that are consumable by the electronic resource management system utilized by a particular entity. In some aspects, resource management software instructor 279 determines instructions based on identifying the entities associated with the event and cross-referencing a database storing an indication of the electronic resource management associated with that entity. Resource management software instructor 279 may then provide instructions in a protocol or format that is consumable by the electronic resource management.

In some aspects, resource management software instructor 279 may provide instructions in the form of an event file. As described in greater detail below with respect to electronic resource management system modifier 280 (specifically, extraction module 284), the event file may identify one or more events that has been suspended. The event file may also provide an indication of the event data associated with suspending the event.

In some aspects, resource management software instructor 279 may provide instructions utilizing an application interface that is particular to the electronic resource management system. As described in greater detail below with respect to electronic resource management system modifier 280 (specifically, application interface 286), the resource management software instructor 279 may generate instructions in the form of an application program interface (API) call to modify event data. The API call may provide an indication of the event data associated with suspending the event.

Resource management software instructor 279 may provide information that identifies the event to be suspended (e.g., using an event ID) and information regarding what data stored within memory of an electronic resource management system is to be modified. In some embodiments, resource management software instructor 279 may instruct an electronic resource management system to modify an existing data file of an event (e.g., the unsuspended event) with new event data associated with the suspended event. As used herein, the term modify is meant to be interpreted broadly and may include updating an existing record and/or deleting an existing record along with creating a new record. The instructions may include any information associated with suspending the event (including one or more rerouted events), such as an amount of resources that are to be transferred as indicated by a resource indicator, a scheduled time for reconciling the event, an event ID, entities associated with the event, a source or destination ID, or the like.

In example embodiments, a first electronic resource management system may include first event data in a first data file. The first data file may include event data that identifies a scheduled time for reconciling the event based on an inbound resource. Similarly, a second electronic resource management system may include event data stored in a second data file. The second data file may include a scheduled time for reconciling the same event based on an outbound resource. Based on determining that the event has been suspended, resource management software instructor 279 may instruct the first electronic resource management system to modify the first data file in the first electronic resource management system and the second data file in the second electronic resource management system.

Continuing, resource management software instructor 279 may instruct the first electronic resource management system to modify event data that is stored within its system. In some embodiments, resource management software instructor 279 may instruct the first electronic resource management system to modify the resource indicator from a first amount of inbound resources to a second amount of inbound resources. In some embodiments, the second amount of inbound resources may be higher than the first amount of inbound resources. Resource management software instructor 279 may also instruct the first electronic resource management system to modify the event data to modify the scheduled time for reconciling the event (e.g., by transferring resources) from a first time to a second time. In some embodiments, the first time precedes the second time.

Similarly, resource management software instructor 279 may instruct the second electronic resource management system to modify event data stored in its system. In some embodiments, resource management software instructor 279 may instruct the second electronic resource management system to modify the resource indicator from a first amount of outbound resources to a second amount of outbound resources. In some embodiments, the second amount of outbound resources may be higher than the first amount of outbound resources. Resource management software instructor 279 may also instruct the second electronic resource management system to modify the scheduled time for reconciling the event from the first time to the second time. In some embodiments, the second amount of outbound resources is the same as the second amount of inbound resources.

Continuing with example technologies employed in a financial industry, resource management software instructor 279 may cause one or more electronic resource management systems, such as the buyer's and/or the supplier's electronic resource management system, to modify event data associated with a particular payment. For instance, resource management software instructor 279 may instruct a buyer's electronic resource management system to modify a payment that is stored in a data file having account payable information from $1,000 to $1,100. Resource management software instructor 279 may also instruct the buyer's electronic resource management system to modify the payment date from Aug. 1, 2020 to Sep. 1, 2020. Similarly, resource management software instructor 279 may instruct the supplier's electronic resource management system to modify a payment that is stored in a data file having account receivable information from $1,000 to $1,100. Resource management software instructor 279 may also instruct the supplier's electronic resource management system to modify the payment date from Aug. 1, 2020 to Sep. 1, 2020. It should be appreciated that resource management software instructor 279 is also capable of instructing a financing party's electronic resource management system to modify event data. As stated herein, while particular reference has been made to financial resources, the improvements provided by the technologies are not limited to the financial industry but can be utilized in many different industries.

In aspects where an event is suspended based on rerouting resources through a rerouting entity, resource management software instructor 279 may instruct the relevant electronic resource management systems to store an indication that the resource is being rerouted through a rerouting entity. It should be appreciated that the resource management software instructor 279 may instruct the relevant electronic resource management systems to store an indication of other event data rerouting the resources (e.g., schedule date of the resource transfer, amount of resources being transferred, event ID, or the like).

In particular, resource management software instructor 279 may instruct electronic resource management systems associated with a first and second entity to modify a data file of the unsuspended event to indicate that the resources will be transferred to (or from) the rerouting entity. For example, the first and second electronic resource management systems may initially store an indication that the resource will be transferred to (or from) the first and second entity. In particular, a first electronic resource management system maintained by a computing device associated with the first entity may initially store an indication that the resource transfer is an outbound resource having a destination ID associated with the second entity. A second electronic resource management system maintained by a computing device associated with the second entity may store an indication that the resource transfer is an inbound resource having a source ID associated with the first entity.

Continuing, resource management software instructor 279 may instruct the first and second electronic resource management systems to modify the data file to indicate that the resources associated with the event have been rerouted. For example, the first electronic resource management system to modify the destination ID associated with the second entity to a destination ID associated with the rerouting entity. Resource management software instructor 279 may also provide separate instructions to the second electronic resource management system to modify the source ID associated with first entity to a source ID associated with the rerouting entity. It should be appreciated that the resource management software instructor 279 may instruct the first and second electronic resource management systems to store an indication of other event data associated with rerouting the resources through the rerouting entity (e.g., schedule date of the resource transfer, amount of resources being transferred, event ID, or the like).

Resource management software instructor 279 may also instruct a third electronic resource management systems to include a data file to indicate that the resources will be rerouted through the rerouting entity. It should be appreciated that rerouting the resources through the rerouting entity may be associated with two rerouting events. The first rerouted event may include the transfer of resources from the first entity to the rerouting entity. The second rerouted event may include the transfer of resources from the rerouting entity to the second entity.

Regarding the first rerouted event, resource management software instructor 279 may instruct the first electronic resource management systems to include (e.g., generate) a data file to indicate that a resource will be transferred from the first entity to the rerouting entity. In particular, the third electronic resource management system may be instructed to include a data file that an inbound resource will be transferred from a source ID associated with the first entity. It should be appreciated that the resource management software instructor 279 may instruct the third electronic resource management system to store an indication of other event data associated with the first rerouted event (e.g., schedule date of the resource transfer, amount of resources being transferred, event ID, or the like).

Regarding the second rerouted event, the resource management software instructor 279 may instruct the third electronic resource management system to include (e.g., generate) a data file indicating that a resource will be transferred from the rerouting entity to the second entity. In particular, the third electronic resource management system may be instructed to include a data file of an event associated with transferring an outbound resource to a destination ID associated with the second entity. The resource management software instructor 279 may further instruct the third electronic resource management system to include other event data associated with the second rerouted event (e.g., schedule date of the resource transfer, amount of resources being transferred, event ID, or the like).

While not shown, event modifier 270 may also include components that automatically facilitate the financial transaction according to the suspended event data. For example, event modifier 270 may automatically debit a buyer's financial account (e.g., a bank account) to execute the payment according to the increased (or decreased) payment amount and/or the suspended payment date. Additionally or alternatively, event modifier 270 may automatically issue a payment from a buyer's financial institution to a supplier's financial account according to the increased (or decreased) payment amount and/or the suspended payment date. Additionally or alternatively, event modifier 270 may automatically issue a payment to and/or from a financing party's financial institution.

Electronic resource management system modifier 280 (also referred to as an ERMS modifier 280), in general, receives instructions and modifies stored event data. For example, resource management software instructor 279 may communicate with ERMS modifier 280 so as to indicate which events have been suspended (and/or information regarding a suspended event) and modify event data. For example, resource management software instructor 279 provides instructions to ERMS modifier 280 that includes information that identifies the event to be suspended (e.g., using an event ID) and information regarding how it is to be modified. In some embodiments, ERMS modifier 280 modifies an existing record of event with new event data. As stated, the instructions may include any information associated with suspending the event (including one or more rerouted events), such as an amount of resources that are to be transferred so as to reconcile the event, a scheduled time for reconciling the event, an event ID, entities associated with the event, source ID and/or destination ID, or the like.

Electronic resource management system modifier 280 may include a database modifier 282. Database modifier 282, in general, modifies databases associated with the electronic resource management system, such as electronic resource management system 108a. Database modifier 282 may modify data files associated with an event. In some embodiments, database modifier 282 may modify a resource indictor, and/or a scheduled time of an event, among other event data.

In some embodiments, electronic resource management system modifier 280 includes an extraction module 284. Extraction module 284, in general, receives instructions in the form of an event file and extracts event information about a suspended event. Extraction module 284 may be a modification to a layer (e.g., application layer) of the electronic resource management system. For instance, in order to on-board an entity's system, an entity may be provided a script of command instructions that are specific to entity's electronic resource management system. The command instructions may modify the layer (e.g., application layer) of the electronic resource management system. This may allow the system 200 to integrate and communicate with a variety of electronic resource management systems. In some embodiments, the command instructions alter an inbound and/or outbound component of an adapter for the electronic resource management system (e.g., an SAP adapter). For instance, the command instructions may alter how an electronic resource management system accesses an application server that is in communication with the resource management software instructor 279.

Extraction module 284 may extract event data from an event file communicated by the resource management software instructor 279. For example, the event file may include information about one or more events that have been suspended. Among other information, the event file may include information for modifications to an amount of resources that are to be transferred so as to reconcile the event. For instance, the event file may include information for an updated amount of resources that will be transferred based on suspending the event. In some embodiments, suspending the event may require an increase in the amount of resources. In some embodiments, suspending the event may require a decrease in the amount of resources. Additionally or alternatively, the event file may include information about a modified scheduled time for transferring the resources. The event file may further include other information associated with the event, such as an event ID, identifying the resources as inbound or outbound, entities associated with the event, or the like. The extraction module 284 may thus extract event data from the event file and instruct modifying one or more databases accordingly. In some embodiments, the event file is communicated on a daily, weekly, or monthly basis. For example, a suspended event compiler 278 may compile one or more suspended events for each 24 hour period. Resource management software instructor 279 may then generate an event file for the one or more suspended events on a weekly basis. The event file may then be communicated on a weekly basis.

It should be appreciated that technical problems exist in integrating electronic resource management systems. Conventionally, electronic resource management systems may be third-party systems that are implemented on a user computing device. Third-party electronic resource management systems may restrict the level of access to manipulate an electronic resource management system's software components. By utilizing an extraction module 284, a third-party electronic resource management system may be adapted to receive instructions in the form of an event file, which may avoid having to gain the level of access necessary to manipulate an application layer of a third-party electronic resource management system.

ERMS modifier 280 may include an application interface 286. Application interface 286, in general, receives an instruction to modify event data via a network connection and/or an application program interface (API). In embodiments utilizing an API, application interface 286 may receive an API call having instructions to modify event data. Among other information, the API call may include information for modifications to an amount of resources that are to be transferred so as to reconcile the event. For instance, the API call may include information for an updated amount of resources that will be transferred based on suspending the event. In some embodiments, suspending the original event may require an increase (or decrease) in the amount of resources needed to reconcile the event that has been delayed. Additionally or alternatively, the API call may include information for a modified scheduled time for reconciling the event. Additionally or alternatively, the API call may include other information in order for the ERMS modifier 280 to modify stored event data, such as an event ID, identifying the resources as inbound or outbound, entities associated with the event, or the like. Conventionally, electronic resource management systems may be third-party systems that are implemented on a user computing device. Some third-party electronic resource management systems allow access to implement an application program interface within an electronic resource management system's software components. It should be appreciated that application interface 286 overcomes difficulty in integrating third-party electronic resource management systems as it allows a third-party's electronic resource management system to communicate with other components of system 200. Additionally or alternatively, application interface 286 may limit technical problems of delaying the modification of data within the third-party electronic resource management system because application interface 286 may modify event data in near real-time, such as when it is determined that an event is suspended. Additionally or alternatively, application interface 286 may overcome technical problems as it may allow disparate electronic resource management systems from the same commercial vendor. For example, application interface 286 allows electronic resource management systems from the same vendor to communicate over a network to determine which events have been suspended and the information associated with the suspended event.

Referring still to FIG. 2, the system 200 may comprise storage 250. Storage 250 generally stores information including data, computer instructions (e.g., software program instructions, routines, or services), logic, profiles, and/or models used in embodiments of the disclosure described herein. In an embodiment, storage 250 comprises a data store (or computer data memory). Further, although depicted as a single data store component, storage 250 may be embodied as one or more data stores or may be in the cloud. Some embodiments of storage 250 store resource logic 230, suspension time logic 232, aggregation logic 234, rerouting logic 236, or user profile 240.

Example user profile 240 may generally include information associated with a particular user. At a high level, user profile 240 may store information about events, information about user accounts or devices, and information regarding an entity's settings for suspending an event. As shown, user profile 240 comprises user account(s) and device(s) 242, resource indicator threshold setting 246, and suspension time threshold setting 248. The information stored in user profile 240 may be available to the routines or other components of example system 200.

User account 242 generally comprises information about user accounts associated with the user, user devices (e.g., laptop, phone, or smart speakers/watches), or the electronic resource management system associated with the user. User account 242 may also include information regarding events that are eligible for suspension. Additionally or alternatively, user account 242 may include data that can be used to identify financial transactions, such as invoices, bills, purchase orders, or the like. For example, user account 242 may include information regarding an entity's electronic resource management system and/or one or more resource transfers maintained by the user's electronic resource management system. Some embodiments of user account 242 may store information across one or more databases, knowledge graphs, or data structures. In some embodiments, user-data collection component 210 or activity monitor 262 may use account or device information to obtain user activity, obtain existing event data, and determine the suspension of an events. Further, as described herein, other components of system 200 may utilize the user account 242 to perform their respective operations.

Figure 3:
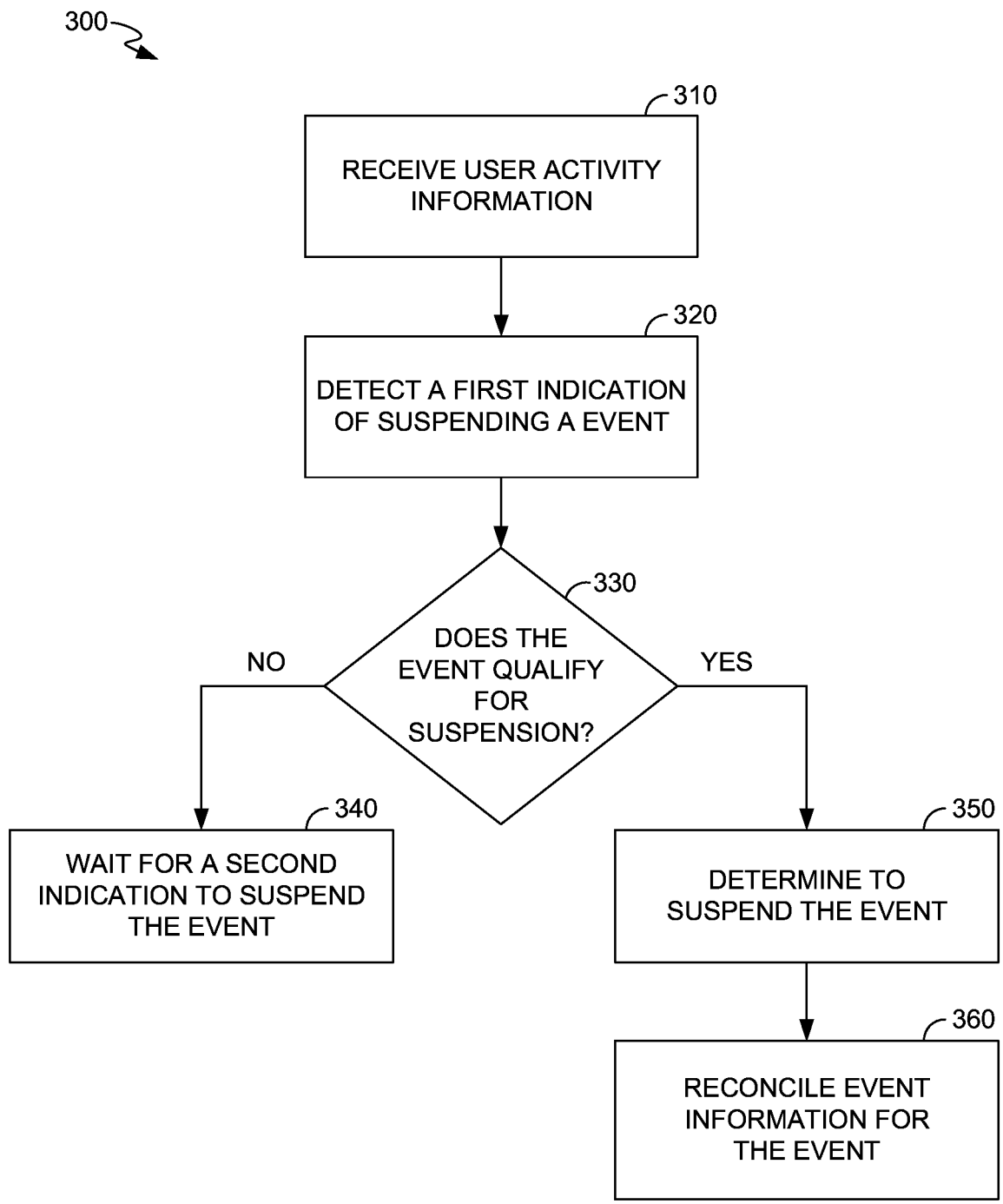
FIG. 3 depicts an example process flow for facilitating an improved computer-performed reconciliation of resources, in accordance with embodiments of the disclosure.

Turning now to FIG. 3, a flow diagram is provided illustrating an overview of an example process flow 300. At block 310, user activity is received. User activity may include one or more communications from an entity associated with an event. The communications may include receiving information (e.g., event data) about an event, an entity's approval of suspending an event, and/or one or more event suspension parameters. User activity may be received via user-data collection component, such as user-data collection component 210, described in FIG. 2. For example, an embodiment of block 310 may receive information about an event (or, in some instances, information about suspending an event). It should be appreciated that the event may be an event, which is to occur at some point in the future. In some embodiments, information about the event may include event data associated with an event, which may be stored in one or more electronic resource management systems, such as electronic resource management system 108a, described in FIG. 1.

At block 320, a first indication to suspend an event is detected. Event detector, such as event detector 260, described in FIG. 2, may determine whether there is an indication to suspend an event based on the user activity from a first user. In some aspects, the first entity may be the entity transferring the resource to a second entity. It is contemplated that the first entity may be the entity receiving the resource from the second entity. It is further contemplated that the first entity may be a rerouting entity.

The indication of suspending the event may be detected based on determining that a first entity associated with the resource transfer has approved that the event can be suspended. Additionally or alternatively, indication of suspending the event may be detected based on determining whether one or more event suspension parameters associated with suspending the event have been provided by the first entity. By way of example, the one or more event suspension parameters may include a resource indicator threshold setting, such as resource indicator threshold setting 246, described in FIG. 2. Additionally or alternatively, the one or more parameters may include a suspension time threshold setting, such as suspension time threshold setting 248, described in FIG. 2. Additional details of embodiments of block 310 are provided in connection to event detector 260 (or, more specifically, suspension approval determiner 264 and event suspension parameter determiner 266) and user profile 240, described in FIG. 2.

At block 330, process flow 300 determines whether the event qualifies for suspension. In some aspects if one or more entities associated with the event has approved the suspension of the event and/or one or more event parameters, the event may qualify for suspension. Additional details of embodiments of block 310 are provided in connection to event detector 260 (or, more specifically, event eligibility determiner 268).

Additionally or alternatively, embodiments of block 330 may determine if other entities associated with the event have provided an indication to suspend the event. For example, it may be determined whether a second entity has approved the suspension of the event and/or provided one or more suspension parameters. The one or more suspension parameters may include a resource indicator threshold setting, such as resource indicator threshold setting 246, described in FIG. 2. Additionally or alternatively, it may be determined whether the second entity has provided a suspension time threshold setting, such as suspension time threshold setting 248, described in FIG. 2. If the other entities associated with event have provided an indication, the event may qualify for suspension and process flow may proceed to block 350. It should be appreciated that embodiments of block 330 may include determining that each entity associated with the event has provided an indication of suspending the event. In some aspects, this may include an indication from a rerouting entity.

In some aspects, the second entity may be the entity receiving the resource from the first entity. It is contemplated that the second entity may be the entity transferring the resource to the first entity. It is further contemplated that the second entity may be a rerouting entity. Additional details of embodiments of block 330 are provided in connection to event detector 260 (or, more specifically, suspension approval determiner 264, event suspension parameter determiner 266, or event eligibility determiner 268) and user profile 240, described in FIG. 2.

At block 340, process flow 300 determines to monitor a second entity's user activity for an indication to suspend the event. The indication of suspending the event may be detected based on determining that the second entity has approved the suspension of the event. Additionally or alternatively, the indication of suspending the event may be detected based on determining whether one or more event suspension parameters associated with suspending the event have been provided by the second entity. For example, an activity monitor, such as activity monitor 262, described in FIG. 2, may monitor the second entity's communications for an indication that the second entity approves the suspension of the event. In some embodiments, based on receiving an indication of suspending the event from the second entity, process flow 300 may return to block 330 so as to determine whether the event qualifies for suspension.

In some embodiments, the second entity may be prompted to provide an indication that the event qualifies for suspension. For instance, the second entity may be notified that the event has been approved by a first entity and request an indication from the second entity. In some aspects, an electronic communication may be generated with information about the event, which is then communicated to a computing device or user profile (e.g., user profile 240) associated with the second entity. Additional details of embodiments of block 340 are provided in connection to event detector 260 (or, more specifically, suspension approval determiner 264 and event suspension parameter determiner 266) and user profile 240, described in FIG. 2.

At block 350, embodiments determine to suspend the event. Embodiments of block 350 may also determine information regarding the suspension of the event, such as new event data. Some embodiments of block 350 may utilize information about an event (e.g., event data) that qualifies for suspension and/or one or more event suspension parameters to determine new event data associated with suspending the event, such as an increase (or decrease) of resources to be transferred and/or a change in the time for transferring the resource. In some aspects, determining to suspend the event may be based on the occurrence of a triggering event. For instance, the triggering event may be a designated time to determine whether or not to be suspended.

Determining new event data may include determining a change or total in the amount (e.g., quantity) of resources that are to be transferred. In some embodiments, suspending the event depends on increasing (or decreasing) the amount of resources to be transferred. In some instances, there may be an increase (or decrease) of the resources transferred in order to suspend the event. Some embodiments utilize one or more entities' thresholds for increasing (or decreasing) the amount of resources transferred, an amount of resources needed to achieve a particular rate of increase (or decrease) in resources over a particular period of time, or the like to determine an amount of resources that will be transferred if the event is suspended.

Determining new event data may include determining a time period for suspending the event. An event may be suspended from a first time (associated with a non-suspended event) to a second time (associated with the suspended event). For instance, the event may be suspended such that a scheduled time for a resource transfer is modified from a first scheduled time to a second scheduled time, where the second scheduled time is after the first scheduled time. To determine that the event should be suspended for a particular amount of time, one or more suspension time thresholds may be utilized. In some embodiments, a time is determined from about the minimum suspension time threshold associated with the first entity to about the maximum suspension time threshold associated with the second entity. The second time may satisfy the minimum suspension time threshold set by the first entity (e.g., a time that would at least meet or exceed the minimum threshold) and satisfy the maximum suspension time threshold set by the second entity (e.g., a time that would at least meet or fall below the maximum threshold). Other predetermined calculations may be used to determine how long to suspend the event.

In some embodiments, the event may be suspended based on achieving a particular increase (or decrease) in the resources with respect to time. By way of example, an event may be suspended based on a user-configurable rate of increase (or decrease) in resources with respect to time. In some aspects, the event may be suspended for any amount of time (or a not-to-exceed threshold) so long as it meets a rate of increase (or decrease) in the amount of resources that are going to be transferred. Block 350 may be performed by event modifier 270 or, more specifically, event suspension engine 271 (e.g., resource indicator determiner 272, suspension time determiner 274, event aggregator 275, or event suspension determiner 277) as described in FIG. 2.

At block 360, event information for the event is reconciled. In some embodiments, one or more electronic resource management systems are instructed to modify event data based on the determination to suspend the event. For example, information that identifies the event to be suspended (e.g., using an event ID) and information about the suspension of the event (e.g., the new amount of resources to be transferred or the newly scheduled time for the resource transfer) is communicated to an electronic resource management system.

In some embodiments, instructions are generated to modify resource indicators for an amount of outbound and/or inbound resources for a first and/or second electronic resource management system, respectively. Particularly, instructions may be generated to modify event data stored in a first electronic resource management system by modifying the resource indicator from a first amount of outbound resources to a second amount of outbound resources. In some embodiments, the second amount of outbound resources may be higher than the first amount of outbound resources. Additionally or alternatively, instructions may be generated to modify event data stored in a second electronic resource management system by modifying the resource indicator from the first amount of inbound resources to the second amount of inbound resources. Similarly, instructions may be generated to modify the first and/or second electronic resource management system to modify the scheduled time for transferring the resources from a first time to a second time.

In some embodiments, suspended events specific (e.g., relevant) to an entity are compiled. For example, all the events associated with a particular entity transferring (and/or receiving) a resource may be compiled and provided to that particular entity. In some embodiments, the one or more suspended events are compiled by storing an indication of the events to be suspended in a temporary location within computer memory, such as a database of suspended events to be reconciled. The indication of the events may be structured and/or provided based on the entity associated with the event, whether the resource is an inbound resource transfer, whether the resource is an outbound resource transfer, resource indicators associated with the amount of resources to be transferred, event ID, a time for suspending the event (e.g., a date in which the suspended resource transfer will occur), or other event information. In some aspects, the suspended events may be compiled in the form of an event file that is readable by the one or more electronic resource management systems, such as an extraction module 284, described in FIG. 2. Additional embodiments of compiling one or more suspended events are described in connection to suspended event compiler 278 of FIG. 2.

Instructions may be provided to the one or more electronic resource management systems to modify event data. As discussed herein, the one or more electronic resource management systems may consume an event file. Additionally or alternatively, one or more electronic resource management systems may be instructed via an application interface, such as application interface 286, described in FIG. 2. Additional details of embodiments of block 360 are provided in connection to event detector 260 (or, more specifically, suspended event compiler 278 and resource management software instructor 279) and electronic resource management system modifier 280 (or, more specifically, database modifier 282, extraction module 284, application interface 286) described in FIG. 2.

Figure 4:
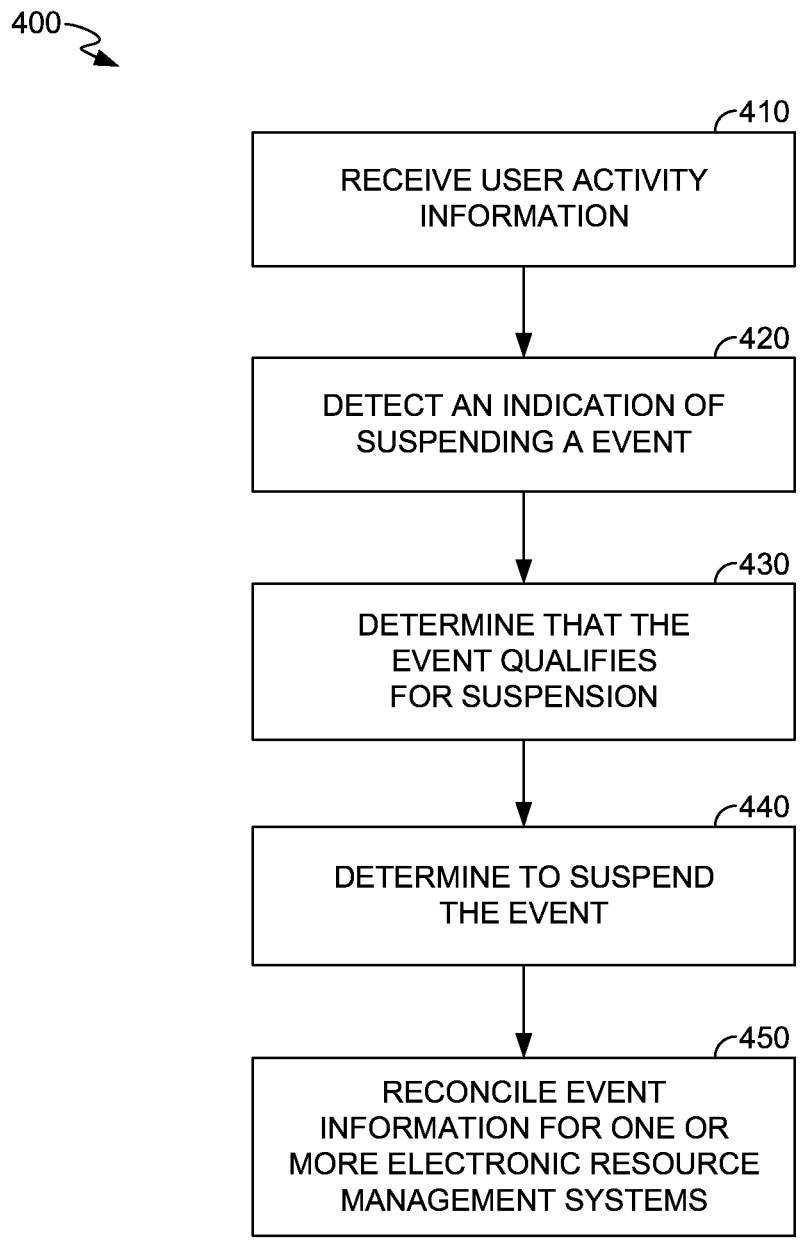
FIG. 4 depicts another example process flow for facilitating an improved computer-performed reconciliation of resources, in accordance with embodiments of the disclosure.

Turning now to FIG. 4, a flow diagram is provided illustrating an overview of an example process flow 400. At block 410, user activity is received. User activity may include information associated with an event (e.g., event data) and/or information associated with suspending the event. Embodiments of block 410 may be performed by an entity-data collection component and/or an activity monitor, such as user-data collection component 210 and/or data and communication monitor 262, described in FIG. 2. The user activity may include any electronic communications, such as internet browser activity, application activity, email, or the like. Additional embodiments of block 410 are described in connection to user-data collection component 210 and/or Data and communication monitor 262, described in FIG. 2.

At block 420, an indication of suspending an event is detected. An indication may include an approval for suspending the event. In some embodiments, the indication may include one or more event suspension parameters. For instance, in some embodiments, one or more entities may provide one or more thresholds for suspending the event, such as a resource indicator threshold setting 246 and/or a suspension time threshold setting 248, as described in greater detail with respect to FIG. 2. Some embodiments of block 420 may be performed by event detector 260 or, more specifically, by suspension approval determiner 264 and/or event suspension parameter determiner 266, of FIG. 2. Additional embodiments of block 420 are described in connection to event detector 260 of FIG. 2.

At block 430, embodiments determine that the event qualifies for suspension. The event may be suspended based on determining that one or more entities associated with the event have provided an indication that the event qualifies for the suspension, such as approving the suspension of the event and/or providing one or more thresholds for suspending the event. In example embodiments, each entity associated with the event (which can include the rerouting entity) provides an indication of suspending the event. Some embodiments of block 430 may be performed by event detector 260 of FIG. 2. Additional embodiments of block 430 are described in connection to event detector 260 of FIG. 2.

At block 440, embodiments determine to suspend the event. To determine to suspend the event, embodiments may utilize information about the event (event data) and/or one or more suspension parameters. For instance, an event may be suspended based on analyzing one or more thresholds provided by an entity, such as a resource indicator threshold and/or suspension time threshold. Embodiments may also determine to suspend the event based on determining that one or more events may be aggregated. Embodiments may also determine to suspend the event based on determining that the event can be rerouted. Additional embodiments of block 440 are described in connection with event modifier 270 (e.g., event suspension engine 271). It should be appreciated that not all events that qualify for suspension will necessarily be suspended. For example, only a portion of the events that qualify for suspension may actually be suspended.

In some embodiments, events are determined to be suspended based on the occurrence of a triggering event. The triggering event may be a closing of a period of time in which events can qualify for suspension. In some embodiments, the triggering event may be a re-occurring event that happens periodically, such as daily, weekly, or monthly.

Block 440 may also include generating new event data associated with suspending the event. The new event data may include information about changes to the event in response to suspending the event. The new event data may include an increase (or decrease) of resources to be transferred and/or a change in time for transferring the resource. For example, embodiments may determine a modification to a resource indicator associated with an existing event data, such as event data managed by one or more electronic resource management systems, in response to suspending the event. Additionally or alternatively, embodiments may determine that a time associated with the existing event data should be modified so as to suspend the event. In some embodiments, the event may be suspended by one or more hours, days, weeks, months, or the like. By suspending the event, it may delay a transfer of a resource from the first party to the second party. Some embodiments of block 440 may be performed by event modifier 270 of FIG. 2. Additional embodiments of block 440 are described in connection to event modifier 270 of FIG. 2.

At block 450, embodiments may cause event information for one or more electronic resource management systems to be reconciled. Some embodiments of block 450 determine which events have been suspended and information regarding the suspended event. In some embodiments, suspended events may be identified based on the entity associated with the event, whether the resource is an inbound resource transfer, whether the resource is an outbound resource transfer, resource indicators, event ID, a time for suspending the event (e.g., a date in which the suspended resource transfer will occur), or other event information. Instructions may be generated to cause the relevant electronic resource management system to modify (and/or include) the information regarding the suspended event.

In some embodiments, a first electronic resource management system may be instructed to modify event data such that it corresponds to event data stored in a second electronic resource management system. For instance, embodiments may provide information regarding the suspended event data to a first electronic resource management system that allows it to modify event data associated with an inbound resource, including a resource indicator and/or the scheduled time for the resource transfer. Embodiments may also provide information regarding the suspended event to a second electronic resource management system that allows it to modify event data associated with an outbound resource, including a resource indicator and/or the scheduled time for the resource transfer.

In some embodiments, instructions are provided based on generating one or more event files. The event file may be consumable by an extraction module, such as extraction module 284. The instructions may include any information associated with suspending the event (including one or more rerouted events), such as an amount of resources that are to be transferred so as to reconcile the event, a scheduled time for the event, an event ID, entities associated with the event, a source ID and/or a destination ID, or the like. In some embodiments, instructions are provided based on generating instructions to modify event data via a network connection and/or an application program interface (API). Block 450 may be performed by event modifier 270 or, more specifically, resource management software instructor 279, and electronic resource management system modifier 280 as described in FIG. 2. Additional embodiments of block 450 are described in connection to event modifier 270 and/or electronic resource management system modifier 280 of FIG. 2.

Figure 5:
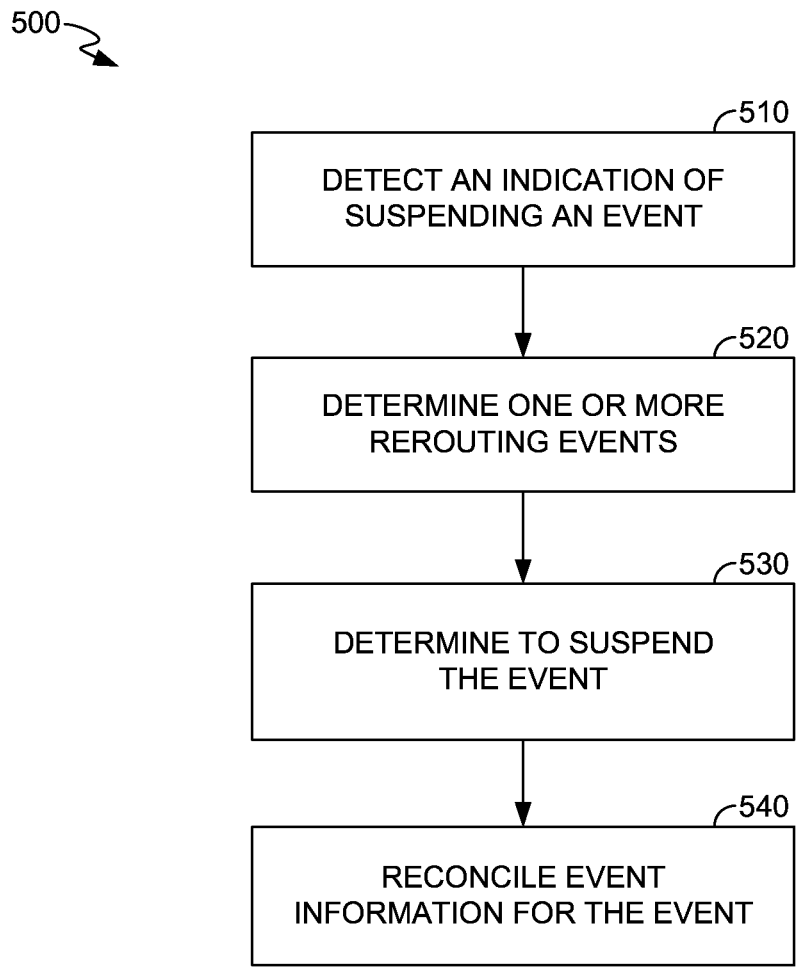
FIG. 5 depicts another example process flow for facilitating an improved computer-performed reconciliation of resources based on one or more rerouting events, in accordance with embodiments of the disclosure.

Turning now to FIG. 5, a flow diagram is provided illustrating an overview of an example process flow 500. At block 510, an indication to participate in the suspension of an event is detected. In some embodiments, an indication to participate in the suspension of an event may be received from a rerouting entity. An indication may include an approval for participating in suspending a particular event. Alternatively, the indication may be a general approval to participate in the act of suspending any event. In some embodiments, the indication may include one or more event suspension parameters. For instance, in some embodiments, the rerouting entity may provide one or more thresholds for suspending the event. It should be appreciated that a first and/or a second entity may also provide an indication of suspending an event.

In some embodiments, one or more event suspension parameters may include as a resource indicator threshold setting 246 and/or a suspension time threshold setting 248, as described in greater detail with respect to FIG. 2. For example, the one or more event suspension parameters may be received from one or more rerouting computing devices associated with the rerouting entity. Some embodiments of block 510 may be performed by event detector 260 or, more specifically, by suspension approval determiner 264 and/or event suspension parameter determiner 266, of FIG. 2. Additional embodiments of block 510 are described in connection to event detector 260 of FIG. 2.

At block 520, one or more rerouting events are determine. The one or more rerouting events may include rerouting a resource transfer through a rerouting entity. For example, an unsuspended event may be associated with a resource transfer from a first to a second entity. Specifically, the resource transfer may include transferring a resource from a source ID associated with the first entity to a destination ID associated with the second entity. A resource router, such as resource router 276, may determine that one or more rerouting events can be utilized separate this resource transfer into a plurality of rerouted resource transfers that involve the rerouting entity.

The first rerouting event may include transferring a first resource (e.g., a "first rerouted resource") from the first entity to the rerouting entity. Event data for the first rerouting event may include transferring a first resource from the source ID associated with the first entity to a destination ID associated with the rerouting entity (e.g., a "rerouted destination"). The second rerouting event may include transferring a second resource (e.g., a "second rerouted resource") from the rerouting entity to the first entity. Event data for the second rerouting event may include transferring a second resource from a source ID associated with the rerouting entity to the destination ID associated with the second entity. Some embodiments of block 520 may be performed by event modifier 270 of FIG. 2, such as resource router 276. Additional embodiments of block 520 are described in connection to event modifier 270 of FIG. 2.

At block 530, embodiments determine to suspend the event. Embodiments may determine to suspend the event based on rerouting the resource transfer through the rerouting entity. Embodiments may determine to suspend the event based on determining that there can be an increase (or decrease) in the amount of resources that are transferred. The amount of resources transferred may satisfy one or more event suspension parameters provided by the first entity, the second entity, and/or the rerouting entity.

Embodiments may determine to suspend the event based on scheduling the rerouting events so as to satisfy one or more event suspension parameters provided by the first entity, the second entity, and/or the rerouting entity. Some embodiments of block 530 may be performed by event modifier 270 of FIG. 2, such as resource router 276. Additional embodiments of block 530 are described in connection to event modifier 270 of FIG. 2 and/or block 440 of FIG. 4.

At block 540, event information is reconciled for the suspended event. In some embodiments, event information for an unsuspended event may be stored in an electronic resource management system (such as electronic resource management system 108*n*) maintained by a computing device associated with the first entity, the second entity, and/or a rerouting entity. The unsuspended event may include event information, such as a resource indicator associated with the amount of resources that will be transferred, a scheduled time for the resource transfer, a source of the resource transfer, and/or a destination of the resource transfer. For instance, a first electronic resource management system maintained by a computing device associated with the first entity may store a resource indicator that reflects the amount of outbound resources being transferred to the second entity. A second electronic resource management system maintained by a computing device associated with the second entity may store a resource indicator that reflects the amount of inbound resources being received from the second entity.

When the event is suspended, one or more electronic resource management systems (such as electronic resource management system 108*n*) maintained by a computing device associated with the first entity, the second entity, and/or a rerouting entity may be instructed to modify previously stored event information for the one or more rerouting events. In some instances, if previously stored event information does not exist, an electronic resource management system may be instructed to generate event information for the one or more rerouting events and/or unsuspended event. Event information for the one or more rerouting events may include a resource indicator associated with the amount of rerouted resources that will be transferred, a scheduled time for the rerouted resource transfer, a source ID, a destination ID, rerouted source ID, and/or a rerouted destination ID.

By way of example, if a resource transfer from a first entity to a second entity is being rerouted through a rerouting entity, the first electronic resource management system may be instructed to store a resource indicator that reflects the amount of resources being transferred to the second entity to a resource indicator that reflects the amount of resources being transferred to the rerouting entity. The second electronic resource management system may be instructed to store a resource indicator that reflects the amount of resources being transferred from the first entity to a resource indicator that reflects the amount of resources being transferred from the rerouting entity. Continuing, the third electronic resource management system may be instructed to store a resource indicator that reflects the amount of resources being transferred from the first entity to the rerouting entity. Additionally or alternatively, the third electronic resource management system may be instructed to store a resource indicator that reflects the amount of resources being transferred from the rerouting entity to the second entity. As such, data across the one or more electronic resource management systems may be reconciled so as to account for suspending the event and information about the one or more rerouted events.

In some embodiments, an electronic resource management system may identify a source and/or a destination of a resource transfer based on a source ID and/or destination ID. The source ID and/or the destination ID may include information that identifies the particular entity, such as a name, account, address, or other information to identify an entity that is receiving or sending the resource. As described herein, the electronic resource management system may be instructed to modify the source ID and/or destination IDs, including the rerouted source ID and/or destination ID, according to the one or more rerouted events. Block 540 may be performed by event modifier 270 or, more specifically, resource management software instructor 279 and/or electronic resource management system modifier 280, as described in FIG. 2. Additional embodiments of block 540 are described in connection to block 450 of FIG. 4, and/or event modifier 270 and/or electronic resource management system modifier 280 of FIG. 2.

Figure 6:
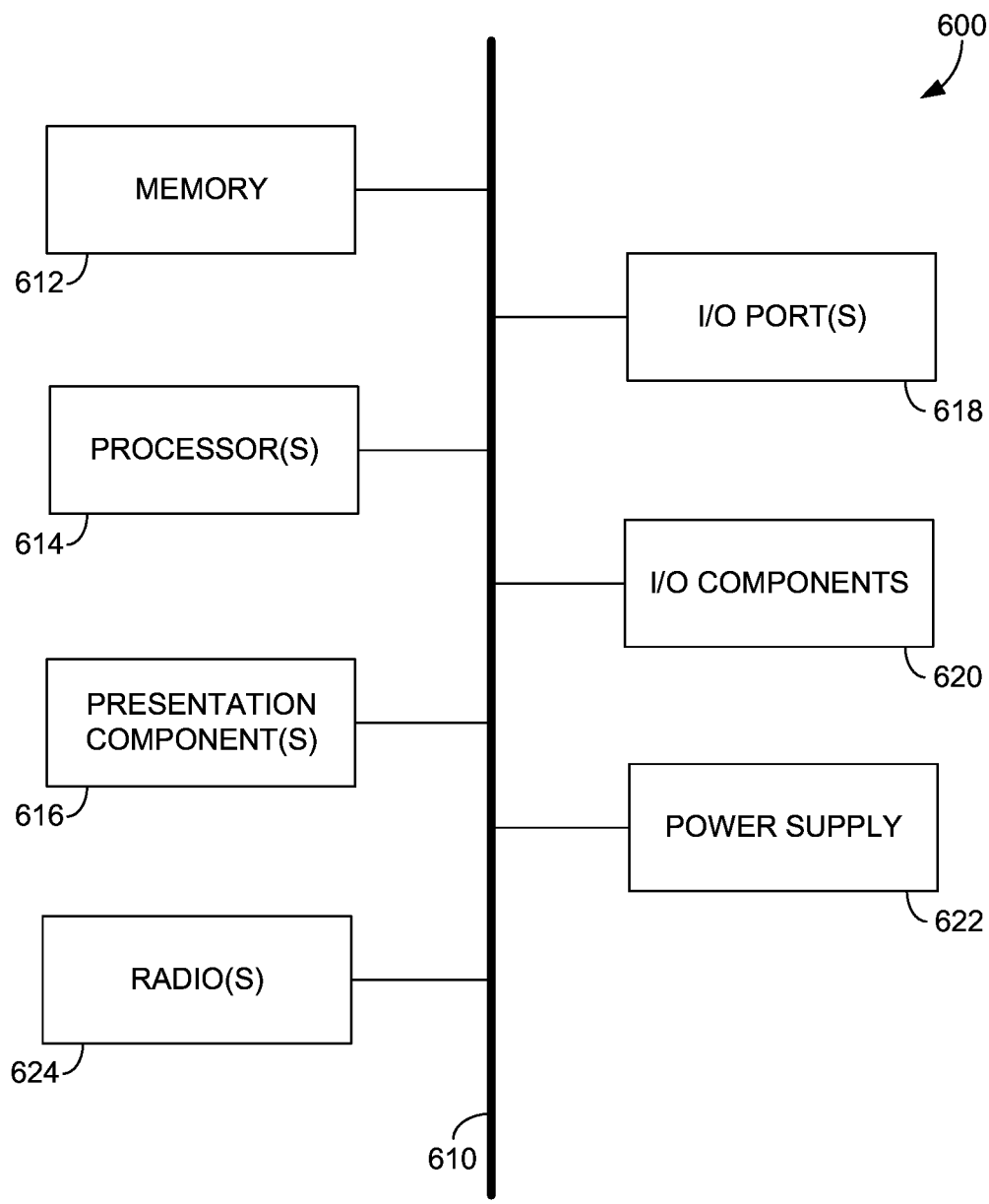
FIG. 6 is a block diagram of an exemplary computing environment suitable for use in implementing an embodiment of the disclosure.

Having described various embodiments of the disclosure, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer-implemented method for reconciling one or more data fields across disparate software platforms, comprising:

receiving a first indication to suspend a first event associated with a first resource indicator that is stored in a first data file associated with a first resource management software utilized by a first entity;
determining that a second indication to suspend the first event is provided by a second entity utilizing a second resource management software, the second indication to suspend the first event indicating:
  a delay or acceleration of a transfer of resources between the first entity and the second entity, and
  a first modification to both the first data file associated with a first resource management software and a second data file associated with the second resource management software based on the delay or acceleration; and
reconciling the first data file by instructing the first resource management software to modify the first resource indicator in the first data file so as to correspond to a second modification to a second resource indicator associated with the second data file, and wherein the first modification and the second modification comprise increasing or decreasing an amount of resources to be transferred based on the delay or acceleration.

2. The computer-implemented method of claim 1, further comprising: instructing the second resource management software to modify the second data file from a third resource indicator to the second resource indicator.

3. The computer-implemented method of claim 1, wherein instructing the second resource management software comprises generating a data file comprising a future time for reconciling the event that is readable by an extraction module of the first resource management software.

4. The computer-implemented method of claim 1, further comprising: determining that the second resource indicator satisfies one or more thresholds that are configurable by one or more computing devices associated with the first entity.

5. The computer-implemented method of claim 4, wherein the one or more thresholds comprise a threshold increase in the resources to be transferred and a threshold period of time following an originally scheduled date of resource transfer.

6. The computer-implemented method of claim 1, further comprising: aggregating the suspension of the first event with the suspension of a second event so as to suspend both a first resource transfer and a second resource transfer.

7. The computer-implemented method of claim 6, wherein the aggregated suspension of the first and second event satisfies a rate of increase in resources with respect to time that is configurable by one or more computing devices associated with the first entity.

8. A computing device, comprising:
one or more processors; and
computer storage memory having computer-executable instructions stored thereon which, when executed by the processor, implement a method comprising:
  receiving a first indication to suspend a first event associated with a first resource indicator that is stored in a first data file associated with a first resource management software utilized by a first entity;
  determining that suspending the first event satisfies one or more parameters provided by a second entity having the first event stored in a second resource management software, wherein suspending the first event indicates:
    a delay or acceleration of a transfer of resources between the first entity and the second entity, and
    a first modification to both the first data file associated with the first resource management software and a second data file associated with the second resource management software based on the delay or acceleration; and
  reconciling the first data file by instructing the first resource management software to modify the first resource indicator in the first data file so as to correspond to a second modification to a second resource indicator associated with the second data file, and wherein the first modification and the second modification comprises increasing or decreasing an amount of resources to be transferred based on the delay or acceleration.

9. The computing device of claim 8, further comprising: instructing the second resource management software to modify the second data file from a third resource indicator corresponding to the first resource indicator to the second resource indicator.

10. The computing device of claim 9, wherein instructing the second resource management software comprises generating a data file comprising the second resource indicator that is readable by an extraction module of the first resource management software.

11. The computing device of claim 8, wherein determining that suspending the first event satisfies the one or more parameters comprises determining that a future time for transferring resources satisfies a time suspension threshold that is configurable by a computing device associated with the second entity.

12. The computing device of claim 8, wherein determining that suspending the first event satisfies the one or more parameters comprises determining that an increase in the transfer of resources satisfies a time suspension threshold that is configurable by a computing device associated with the second entity.

13. The computing device of claim 8, further comprising: aggregating the suspension of the first event with the suspension of a second event so as to suspend both a first resource transfer and a second resource transfer.

14. The computing device of claim 13, wherein the aggregated suspension of the first and second event satisfies a rate of increase in resources with respect to time that are configurable by one or more computing devices associated with the first entity.

15. Computer storage memory having computer-executable instructions stored thereon which, when executed by the processor, implement a method comprising:
  receiving first indication to suspend a first event associated with a first resource indicator that is stored in a first data file associated with a first resource management software utilized by a first entity;
  determining that suspending the first event satisfies one or more parameters provided by a second entity having the first event stored in a second resource management software, wherein suspending the first event indicates:
    a delay or acceleration of a transfer of resources between the first entity and the second entity, and
    a first modification to both the first data file associated with the first resource management software and a second data file associated with the second resource management software based on the delay or acceleration; and
  reconciling the first data file by instructing the first resource management software to modify the first resource indicator in the first data file so as to correspond to a second modification to a second resource indicator associated with the second data file, and wherein the first modification and the second modification comprises increasing or decreasing an amount of resources to be transferred based on the delay or acceleration.

16. The computer storage memory of claim 15, further comprising: instructing the second resource management software to modify the second data file from a third resource indicator corresponding to the first resource indicator to the second resource indicator.

17. The computer storage memory of claim 16, wherein instructing the second resource management software comprises generating a data file comprising the second resource indicator that is readable by an extraction module of the first resource management software.

18. The computer storage memory of claim 15, further comprising: wherein determining that suspending the first event satisfies the one or more parameters comprises determining that a future time for transferring resources satisfies a time suspension threshold that is configurable by a computing device associated with the second entity.

19. The computer storage memory of claim 18, wherein determining that suspending the first event satisfies the one or more parameters comprises determining that an increase in the transfer of resources satisfies a time suspension threshold that is configurable by a computing device associated with the second entity.

20. The computer storage memory of claim 15, further comprising: aggregating the suspension of the first event with the suspension of a second event so as to suspend both a first resource transfer and a second resource transfer.

* * * * *